(12) United States Patent
Williamson

(10) Patent No.: US 10,521,752 B1
(45) Date of Patent: Dec. 31, 2019

(54) AUDITING SYSTEM

(71) Applicant: Susan Elaine Williamson, Raleigh, NC (US)

(72) Inventor: Susan Elaine Williamson, Raleigh, NC (US)

( * ) Notice: Subject to any disclaimer, the term of this patent is extended or adjusted under 35 U.S.C. 154(b) by 292 days.

(21) Appl. No.: 15/455,056

(22) Filed: Mar. 9, 2017

Related U.S. Application Data

(60) Provisional application No. 62/305,702, filed on Mar. 9, 2016.

(51) Int. Cl.
*G06Q 10/06* (2012.01)
*G06Q 10/10* (2012.01)

(52) U.S. Cl.
CPC ........... *G06Q 10/06395* (2013.01); *G06Q 10/063112* (2013.01); *G06Q 10/063114* (2013.01); *G06Q 10/1097* (2013.01)

(58) Field of Classification Search
CPC ......... G06Q 10/00; G06Q 40/06; G06F 17/60
USPC ........................................... 705/7.21
See application file for complete search history.

(56) References Cited

U.S. PATENT DOCUMENTS

| | | | | |
|---|---|---|---|---|
| 8,444,420 B2 * | 5/2013 | Scott | ........... | G09B 19/00 434/219 |
| 8,712,813 B2 * | 4/2014 | King | ........... | G06Q 10/06 705/7.29 |
| 2006/0047551 A1 * | 3/2006 | Cotten | ........... | G06Q 10/06311 705/7.14 |
| 2007/0156531 A1 * | 7/2007 | Schuller | ........... | G06Q 30/02 705/14.13 |
| 2014/0379535 A1 * | 12/2014 | Briet | ........... | G06Q 30/0201 705/28 |

OTHER PUBLICATIONS

Alexander et al (Design and Evaluation of a Continuous Data Level Auditing System), Nov. 2014, Auditing: A Journal of Practice & Theory, p. 1 (Year: 2014).*

* cited by examiner

*Primary Examiner* — Romain Jeanty
(74) *Attorney, Agent, or Firm* — John Rizvi; John Rizvi P.A.-The Patent Professor®

(57) ABSTRACT

An auditing system for creating audits, presenting the audits to auditor users, capturing data via a user interface, compiling results from captured data, and presenting the results, is disclosed. The auditing system is configured to define and present audit elements and sub elements in a parent-child fashion. The auditing system may be configured to extract scores of audit elements into customizable categories. A location of an auditor device may be determined for tailoring audit content to the auditor device based on the determined location. Machine-readable identification tags may be scanned via an auditor device for determining an identity of the scanned identification tag and associating the identification tag with an audit element. Audit results may be presented visually in an interactable graph such that a user may view scores for each category of each audit element. Further, various scheduling systems are disclosed for scheduling work.

19 Claims, 19 Drawing Sheets

|  | Cleaning Crew | Maintenance Crew |
|---|---|---|
| Chair |  |  |
| → Seat | X |  |
| → Arms | X |  |
| → Legs | X | X |

FIG. 21

AUDITING SYSTEM

CROSS-REFERENCE TO RELATED APPLICATION

This application claims the benefit of U.S. Provisional Patent Application Ser. No. 62/305,702, filed Mar. 9, 2016, which is incorporated herein in its entirety.

FIELD OF THE INVENTION

The present invention relates generally to quality management systems, and more particularly to an auditing system for creating audits and capturing data via created audits.

BACKGROUND OF THE INVENTION

It is common for businesses or institutions to desire to monitor and assess the quality of their internal processes. For example, a cruise line may employ an audit by hiring an auditor to examine the quality of employee-guest relations, or evaluate the compliance of health and safety standards. Common auditing methods usually include asking an auditor to take note and report the quality of certain objects or processes. For example, an auditor may be asked to provide a report on the quality of service at a restaurant or the cleanliness of a hotel room.

However, common auditing methods have various problems and limitations. For example, a cruise line may employ an auditor to inspect a series of staterooms, employee-guest relations, a dining experience, and health and safety standards. Common methods will provide the auditor with a pre-planned route with a set of questions. For example, for auditing a stateroom, the auditor may be asked "On a scale of 1 to 5, rate the ambiance in the stateroom". However, this question may generate inconsistencies and inaccuracies. The ambiance of the stateroom may be affected by a plurality of elements, such as smell, the cleanliness of the carpet, and the quality of the lighting. As such, the auditor would have to weigh a perceived quality of multiple individual objects against one another to determine a general ambiance, without capturing any information about the individual objects themselves. Further, common methods merely provide pre-planned static audits to auditors, which may be boring and may lead to further inconsistencies. For example, an auditor walking around a cruise ship looking for an employee-guest relation event may have to wait for the particular employee-guest relation to occur. However, while the auditor is waiting for this event to happen, the auditor is wasting time, and could instead be inspecting nearby items to increase efficiency.

As such, there exists a need for an auditing system that dynamically provides a customizable level of detail for providing a high level of auditing accuracy, precision, consistency, and efficiency.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

An auditing system is disclosed, the system comprising, one or more storage machines holding instructions executable by one or more logic machines to effect the operations of, creating an audit, presenting the audit to an auditor user, capturing data via an interface of the audit, compiling the data as results, and presenting the results.

In another aspect, the audit includes audit elements, the audit elements configured to generate a score.

In another aspect, the instructions are further executable to categorize generated scores.

In another aspect, the instructions are further executable to determine a location of an auditor device for sending audit content to the auditor device according to the location.

In another aspect, a GPS subsystem is included in the system for determining the location.

In another aspect, the instructions are further executable to determine a location via a Wi-Fi positioning system.

In another aspect, the system further includes a machine readable identification device being readable by an auditor device for identifying a real-world object.

In another aspect, the system further includes a database storing employee profile information such that the employee profile information is cross-referenceable with machine readable identification data captured by an auditor device.

In another aspect, the instructions are further executable to define locations of audit elements and present the locations via a map.

In another aspect, the instructions are further executable to present the results via a graph.

In another aspect, the instructions are further executable to receive a user input to schedule a task to be completed at a particular time as a scheduled task, and present the scheduled task to an auditor device.

In another aspect, the instructions are further executable to determine a scheduling value of an audit element and assign a task to a worker according to the scheduling value.

In another aspect, the instructions are further executable to determine a task needing to be completed at a certain time, and determine an appropriate worker for completing the task.

In another aspect, the instructions are further executable to register a status of a task that has been assigned to a worker, as a task status.

In another aspect, the instructions are further executable to, upon registering that a task status is complete, appropriately assigning an auditor to evaluate the task status.

In another aspect, the instructions are further executable to assign tasks according to a work type.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

FIG. 21 presents assigning tasks to specific worker types, in accordance with aspects of the present disclosure.

It is to be understood that like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
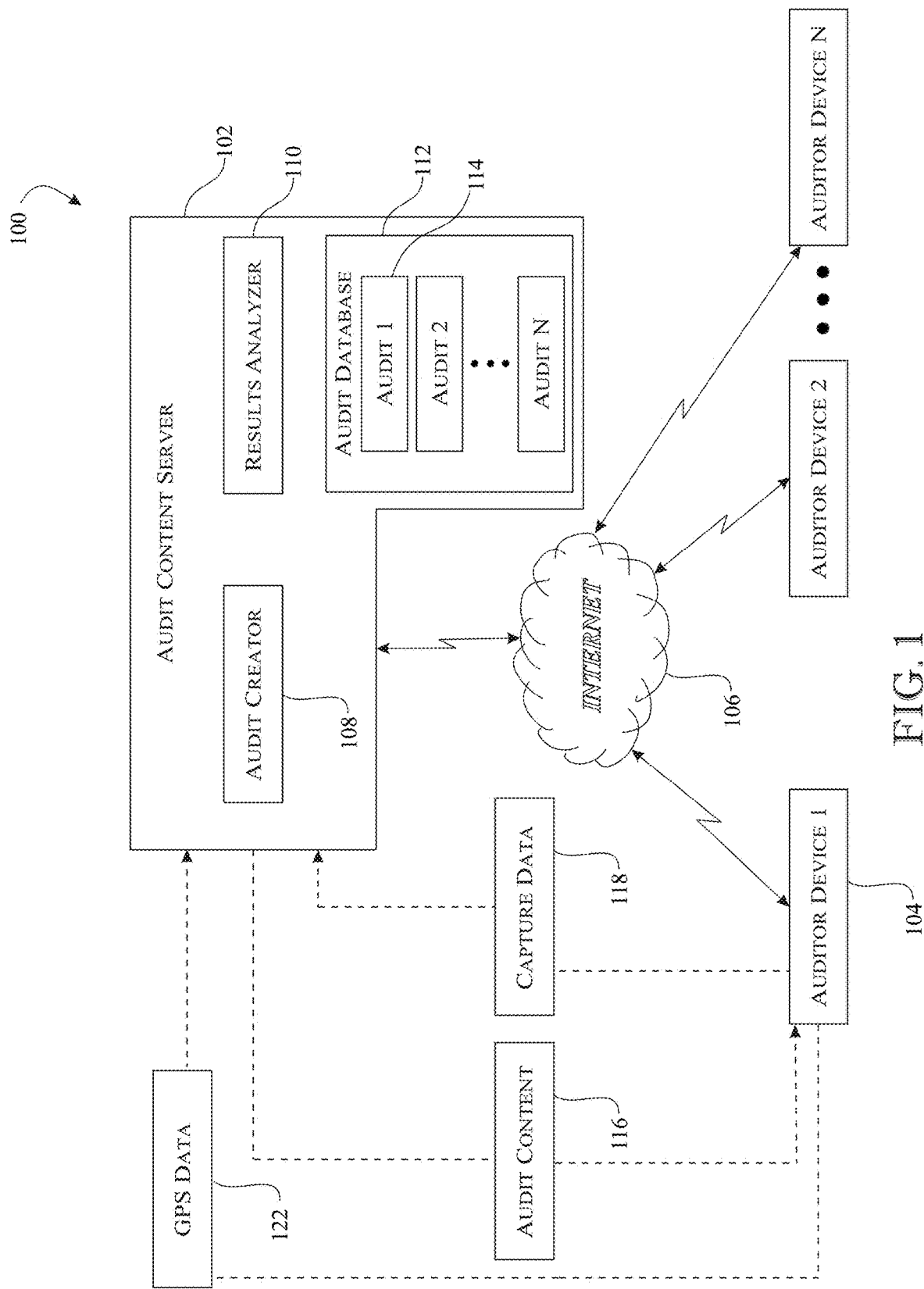
FIG. 1 presents an auditing system, in accordance with aspects of the present disclosure.
Figure 2:
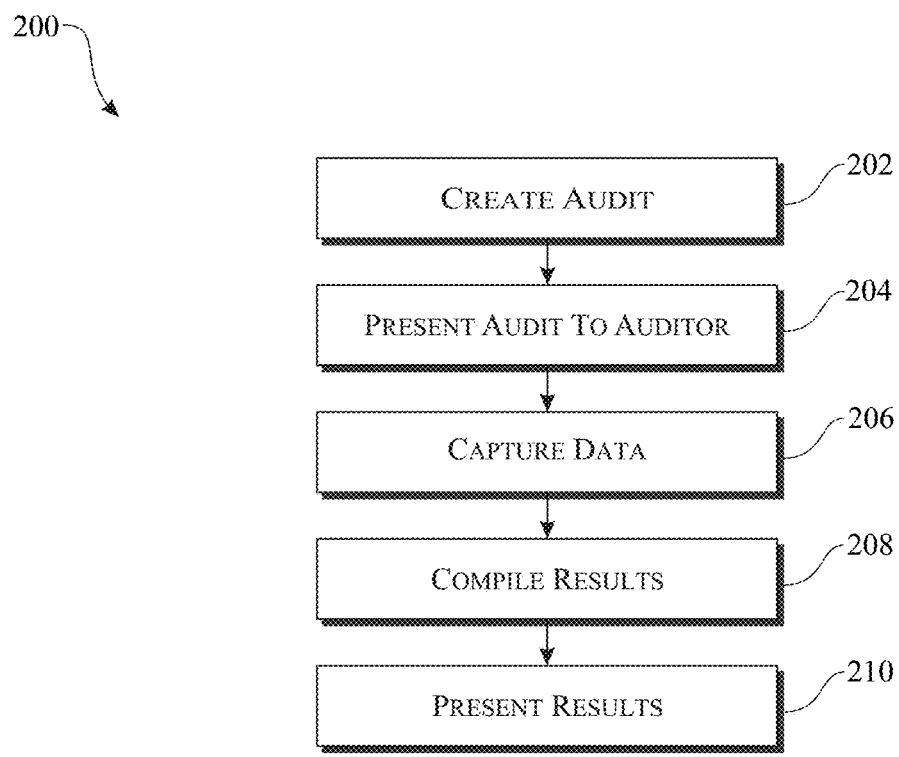
FIG. 2 presents an auditing method, in accordance with aspects of the present disclosure.
Figure 3:
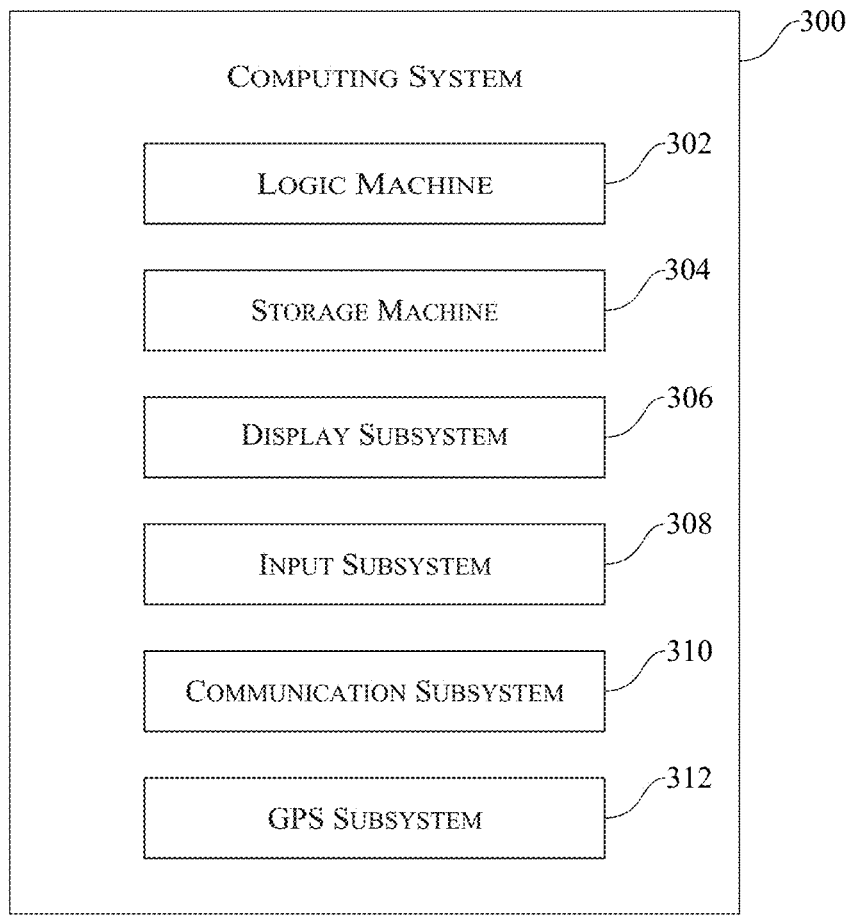
FIG. 3 presents a computing system, in accordance with aspects of the present disclosure.

The illustration of FIG. 1 presents an auditing system 100 including an audit content server 102, one or more auditor devices such as auditor device 104, and a network 106. The audit content server 102 includes an audit creator 108, a results analyzer 110 and an audit database 112. The audit database 112 includes one or more stored audits such as audit 114. The audit database 112 may include employee profile information (e.g. employee ID information), or information for identifying a real world object or data tag (e.g. QR code or barcode data). The audit content server 102 and the auditor devices are communicatively linked via network 106. For example, the network may include wireless or hard-wired connections (e.g. Bluetooth, Wi-Fi, or common internet networks). The audit content server 102 sends audit content 116 (e.g. created audits, instructions, questions, checklists, maps, locations, etc.) to the auditor device 104. For example, audit content may be sent to multiple devices. A plurality of auditor devices in an audit team (i.e. plurality of auditors) tasked to inspect a cruise ship may be provided audits via the network 106. The auditor device 104 receives the audit content 116 and presents the audit content 116 to a user of the auditor device 104. The auditor device 104 captures data and sends the captured data to the audit content server 102. For example, FIG. 1 shows captured data 118 being sent from the auditor device 104 to the audit content server 102. The audit device 120 may send GPS data 122 to the audit content server for locating the auditor device 104 (e.g. GPS subsystem 312 of FIG. 3). The audit content server 102 and/or the auditor devices may include a computing system 300 shown in FIG. 3. The computing devices may be personal computing devices such as touch screen tablet computers, smart phones, desktop computers, or the like, and may include computing system 300 of FIG. 3. The auditing system 100 may hold machine-readable instructions that are executable by a logic machine to perform auditing method 200 presented in FIG. 2. For example, FIG. 2 shows auditing method 200 including creating an audit at creating step 202, presenting an audit to an auditor at audit presenting step 204, capturing data at capture step 206, compiling results at compiling step 208, and presenting results at result presenting step 210. The steps may be executed in any order, or in the order described herein or with respect to FIG. 2.

Figure 4:
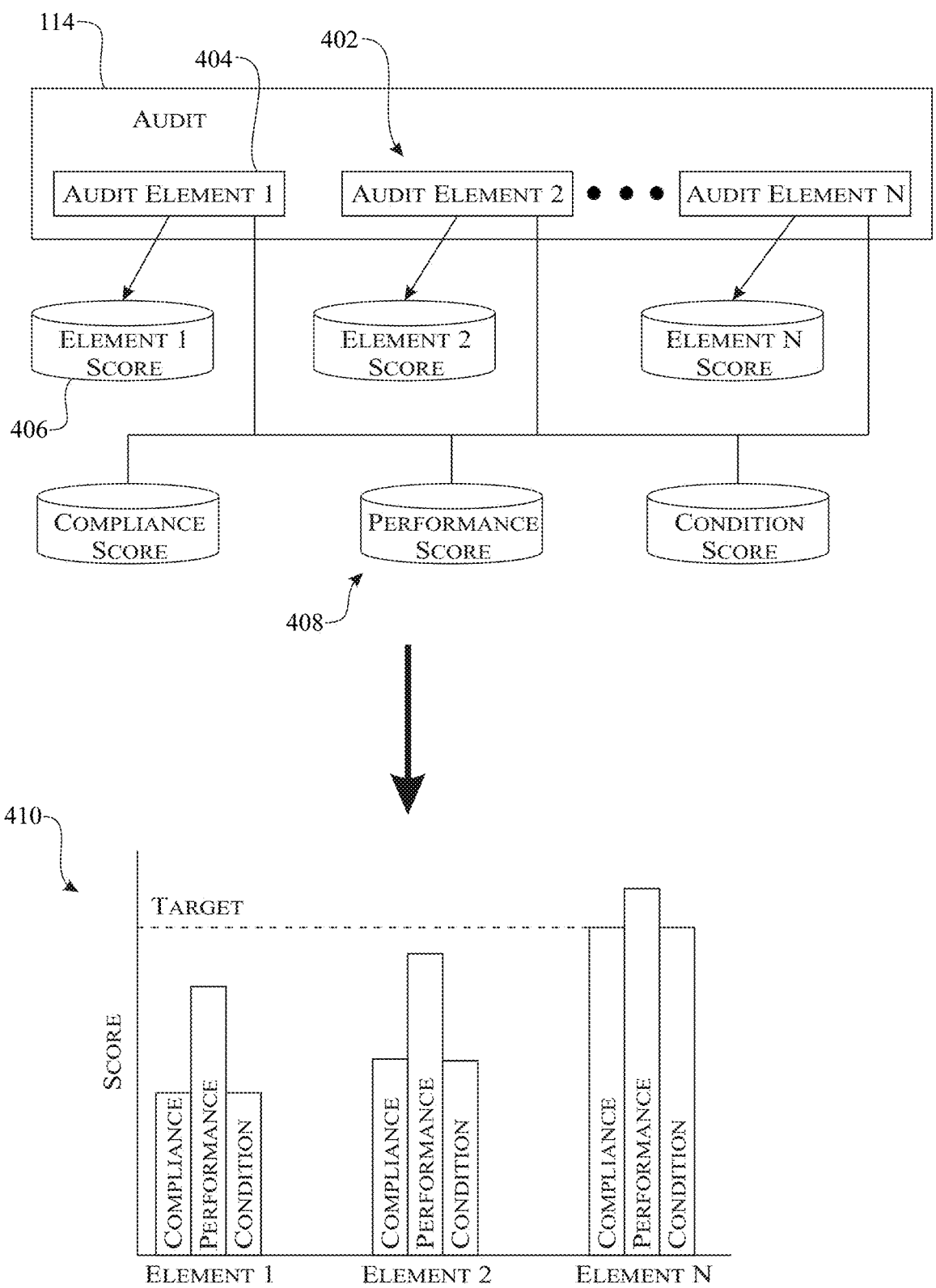
FIG. 4 presents categorizing audit scores and presenting results, in accordance with aspects of the present disclosure.
Figure 5:
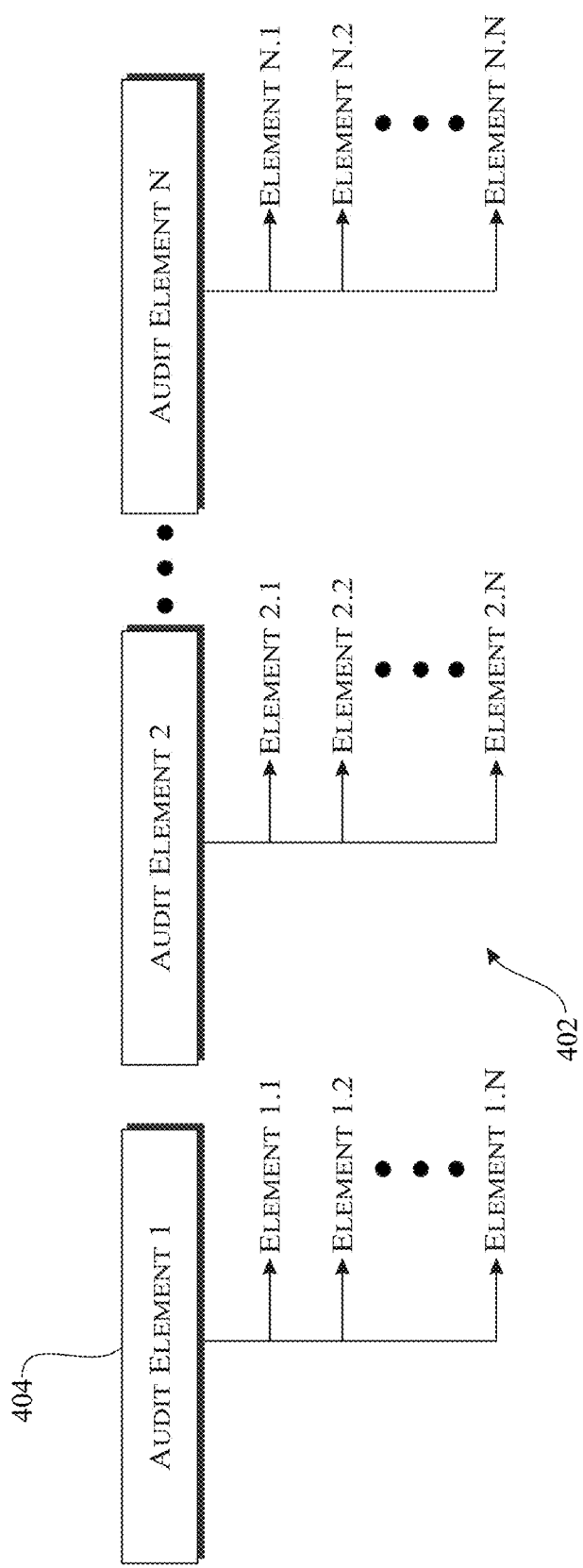
FIG. 5 presents a parent-child relationship for audit elements, in accordance with aspects of the present disclosure.
Figure 6:
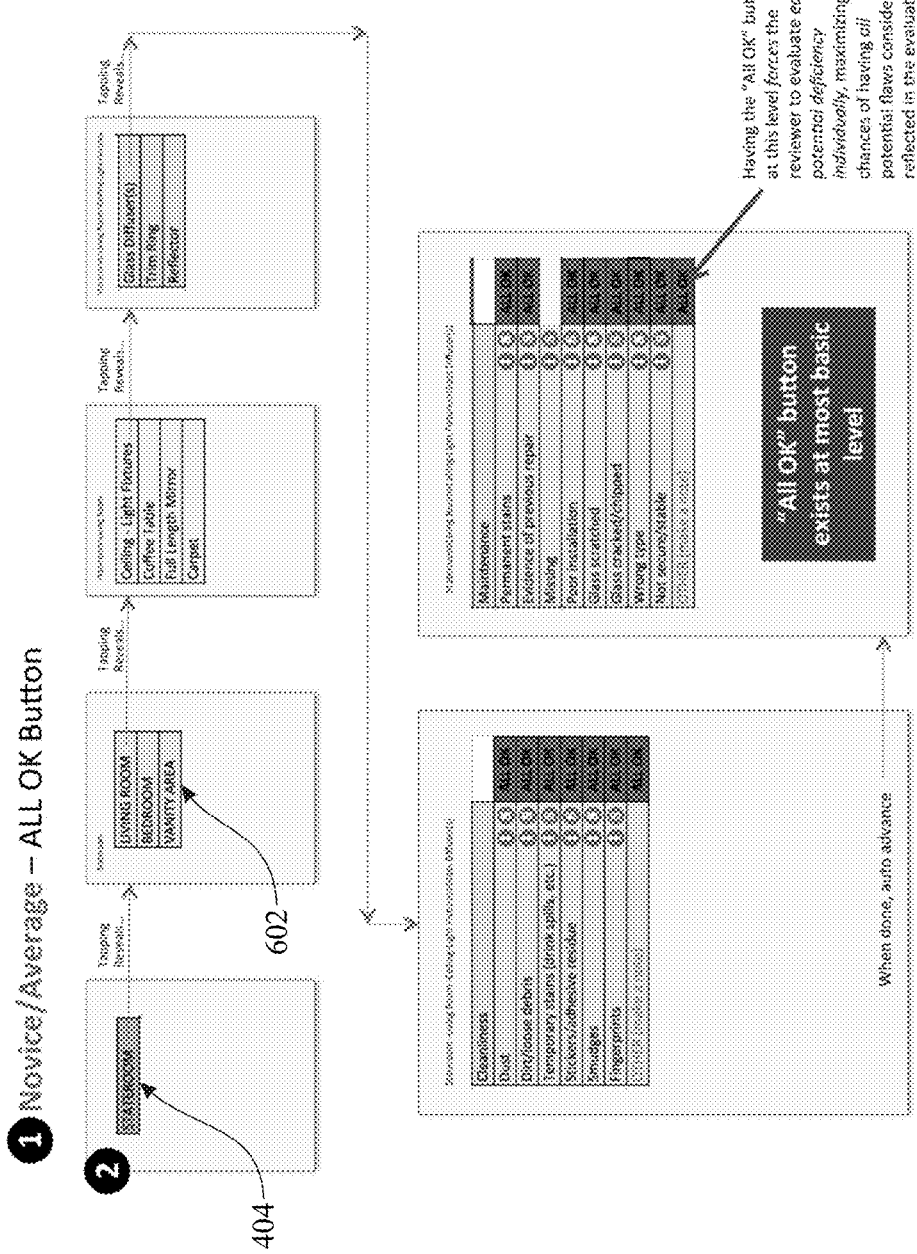
FIGS. 6 and 7 present an exemplary scoring method, in accordance with aspects of the present disclosure.

Creating step 202 creates an audit. For example, created audits may be stored in audit database 112 as shown in FIG. 1. An audit may be created according to received creator user input. For example, a creator user may be presented with a creator graphical user interface (GUI) that a user may interact with via an appropriate user input for defining an audit and subsequent elements or attributes. For example, creating an audit may include defining audit elements. An audit element may be an item, element, or feature that is to be inspected by an auditor. For example, an audit element may be a venue, a hotel room, an employee-customer interaction, a dining experience, a food item, a product, or various sub components thereof. Such audit elements may be Critical Control Points (CCPs) as known in the field of quality management. For example, FIG. 4 presents an audit 114 including a plurality of audit elements 402 (audit element 1, audit element 2 . . . audit element N). For example, audit 114 includes audit element 404. As another example, FIG. 5 presents audit element 1 including element 1.1, element 1.2, . . . element 1.N. Audit element 2 includes element 2.1, element 2.2, . . . element 2.N. Audit element N includes element N.1, element N.2, . . . element N.N. N represents an arbitrary number of audits created and/or stored. As such, a matrix may be formed, the matrix defining an audit and target items that must be inspected by an auditor. As such, an audit element includes sub elements. For example, turning to FIG. 6, a stateroom audit element 404 includes stateroom audit sub-elements 602 (living room, bedroom, vanity area). In other words, an audit element may be a "parent" of a sub-element, the sub-element being a "child" of the "parent". Such a parent-child relationship may be applied to as many audit elements as desired by an audit creator. As such, the auditing system provides a limitless level of detail to an audit creator employed by a hotel, cruise line, or other business that requires a custom-detailed audit. For example, FIG. 6 shows the "living room" sub-element including "ceiling-light features", "coffee table", "full length mirror", and "carpet", all being children of the stateroom audit element 404. Audit creating may include defining the parent-child relationships of audit elements and respective sub-elements, as well as how they are to be presented. Presentation methods are described further below.

Figure 8:
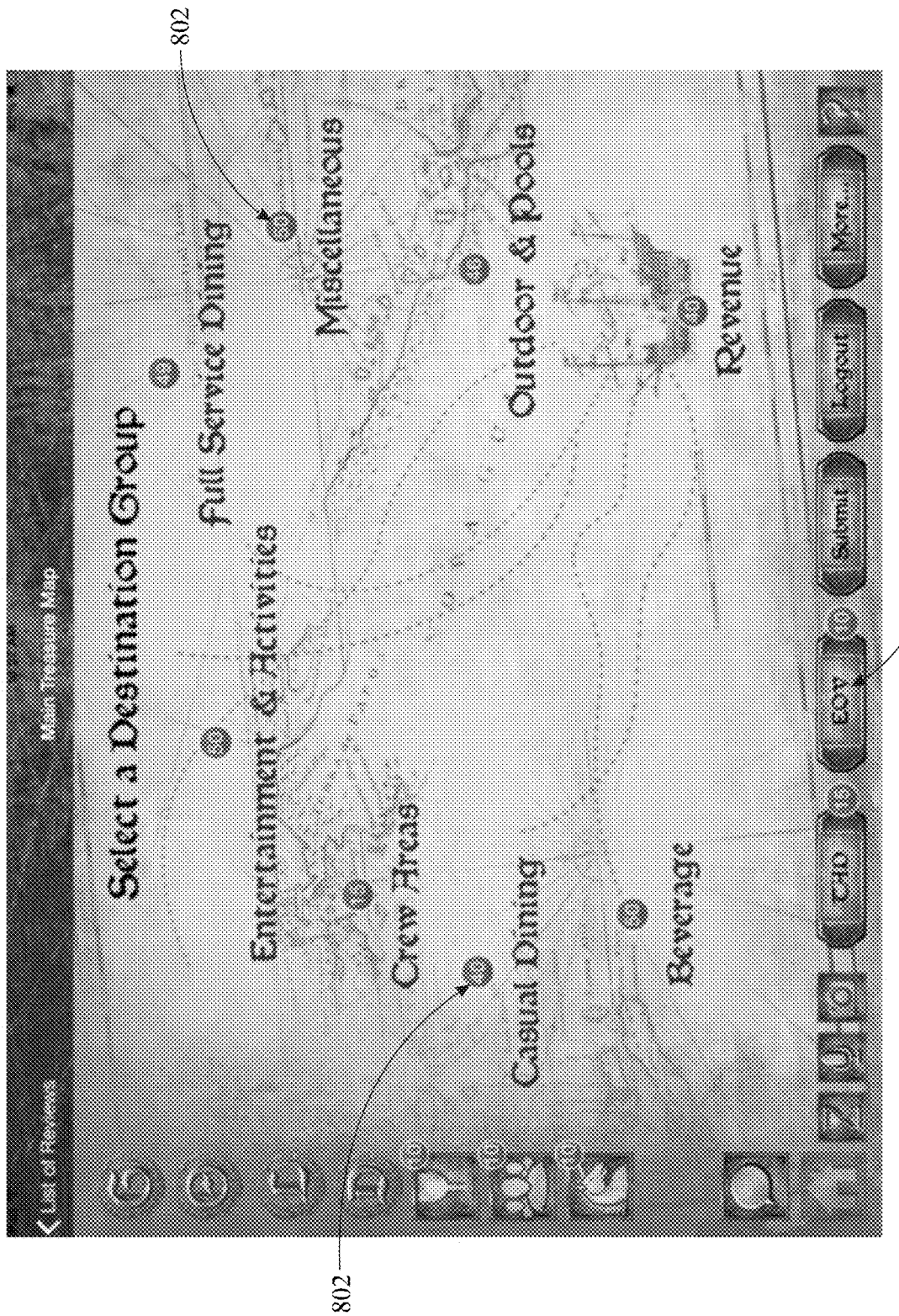
FIGS. 8-10 present audit elements presented on maps, in accordance with aspects of the present disclosure.
Figure 9:
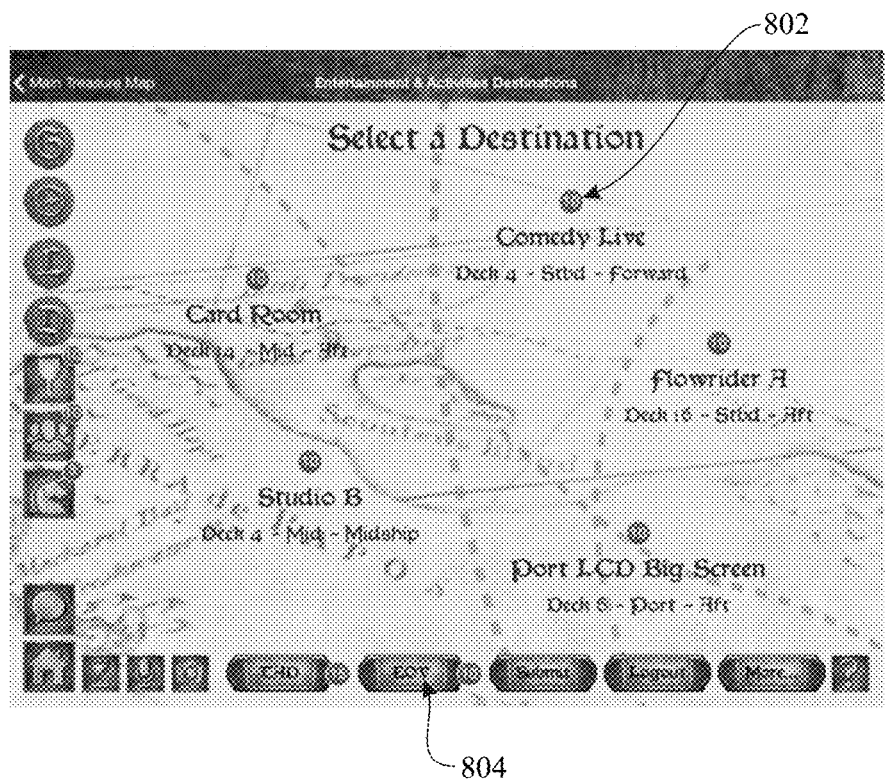
Figure 10:
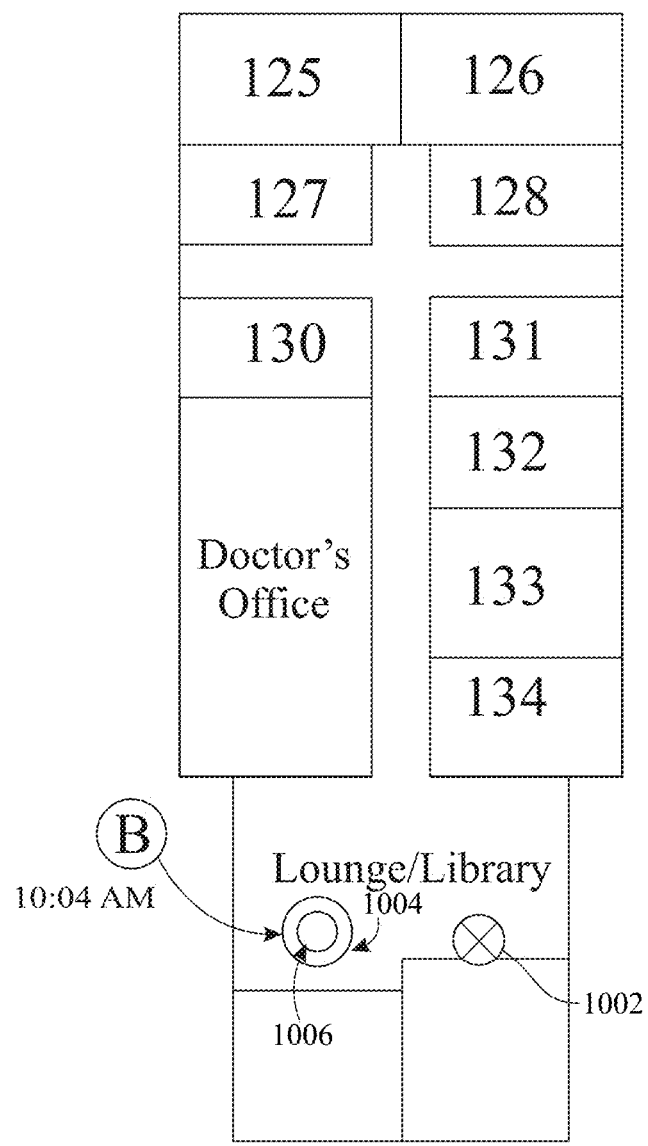

Creating an audit may include defining locations for audit elements. For example, a user input may be received to tie a particular real location to an audit element. The locations may be real locations, such as particular locations on a cruise ship (staterooms, dining rooms, bars, cafes, venues, etc.). The locations may be mapped and displayed to a user. The locations may be presented on a map image or arbitrarily presented as desired by a creator user. For example, a .pdf or an AutoCAD file may be included in an audit for overlaying audit element locations. As an example, FIGS. 8, 9 and 10 show audit elements positioned on a map. More particularly, FIGS. 8, 9, and 10 present a plurality of icons (such as icon 802) presented via or on map images. Each icon may include a display of a number of audit elements at a particular location. For example, FIG. 8 shows a number of audit elements located in particular areas such as "casual dining", "crew areas", or "entertainment & activities". The positions of the icons presented in FIG. 8 are arbitrarily presented as may be desired by a creator user. On the other hand, FIG. 10 shows an exemplary deck plan having one or more icons displayed at real locations on the deck plan (e.g. hospital, lounge/library, particular staterooms). The icons may be linked to subsequent locations upon being selected. For example, "entertainment & activities" of FIG. 8 may be selected or linked for accessing a more detailed set of icons or audit elements shown in FIG. 9. For example, FIG. 9 shows icons representing entertainment locations such as "card room", "comedy live", and "port LCD Big Screen" in response to selecting "entertainment & activities" of FIG. 8. Creating an audit may also include defining particular times for audit elements to be inspected. As such, an audit element may include a profile having location and time information.

Creating an audit may also include defining statistical values and probabilities for presenting audit elements. For example, thousands of audit elements may be stored in the database, but only a certain number may be realistically completed by an auditor user in a given audit (although all audit elements may be available for generating other different audits). As such, a random sample may be selected by an audit creator or a computer algorithm. The sample may be chosen according to a desired margin of error, confidence level, number of questions, or randomization parameters. For example, it may be determined that 11.4% of a total population of audit elements provides an acceptable margin of error or confidence level. Further, importance or priority may be defined for audit elements. For example, certain important audit elements such as the cleanliness of a kitchen may be defined as being high priority. On the other hand, a less important audit element may be defined having low priority for being presented to an auditor user. A high priority may be associated with a higher chance or probability of being presented and a low priority may be associated with a lower chance of being presented. A creator may also define various metrics that describes an audit or audit element. For example, a first metric may be "likelihood" which may take values such as "high", "medium", "low", and "none". Likelihood may refer to the probability that an auditor will visit an inspection site of an audit element (e.g. a location, venue, destination, function) as part of the auditor's normal visit/traffic pattern. A second metric may be "ease of access" (EOA), which may take values such as "easy", "medium", or "effort". For example, EOA may refer to how easy an auditor may access an inspection location. The EOA metric is geared toward auditors who are asked to audit while visiting or vacationing. For example, a location for an audit element may be located adjacent a frequent dining spot for auditors. In this case, this specific location may be labeled "easy" due to the proximity of the likely dining spot. As another example, ease of access may refer to the ease of access to an inspection location (e.g. according to the possibility of the audit element not normally being encountered as part of an auditor's visit). A third metric may be "opportunity", which defines a likelihood of a natural opportunity for observing an audit element, and may take values such as "plenty opportunity", "requires time onsite", or "unicorn". Unicorn is further described below. As a fourth metric, an ease of capture (EOC) metric may be included and considered when creating an audit as a fourth metric. EOC is also known as "Speed of Observation". More particularly, if an opportunity to observe an audit element occurs, the EOC measure, metric, or rating describes how long it would take for an auditor to observe the audit element (e.g. situation, transaction, condition) for producing a fair evaluation. For example, the EOC metric may take values such as very quick, quick, medium, requires time, and long time. If an auditor was to evaluate a "conflict resolution" skill at a Guest Help Desk, observing an entire encounter between a guest and an employee may take, for example, 15 minutes. Given this information, the specific question or checklist (or other data capture methods described herein) regarding this encounter would likely be labeled as "requires time" or as "long time" as described above. Clients or businesses such as cruise lines may select or define any of the herein described metrics or parameters for creating or developing an audit.

Figure 11:
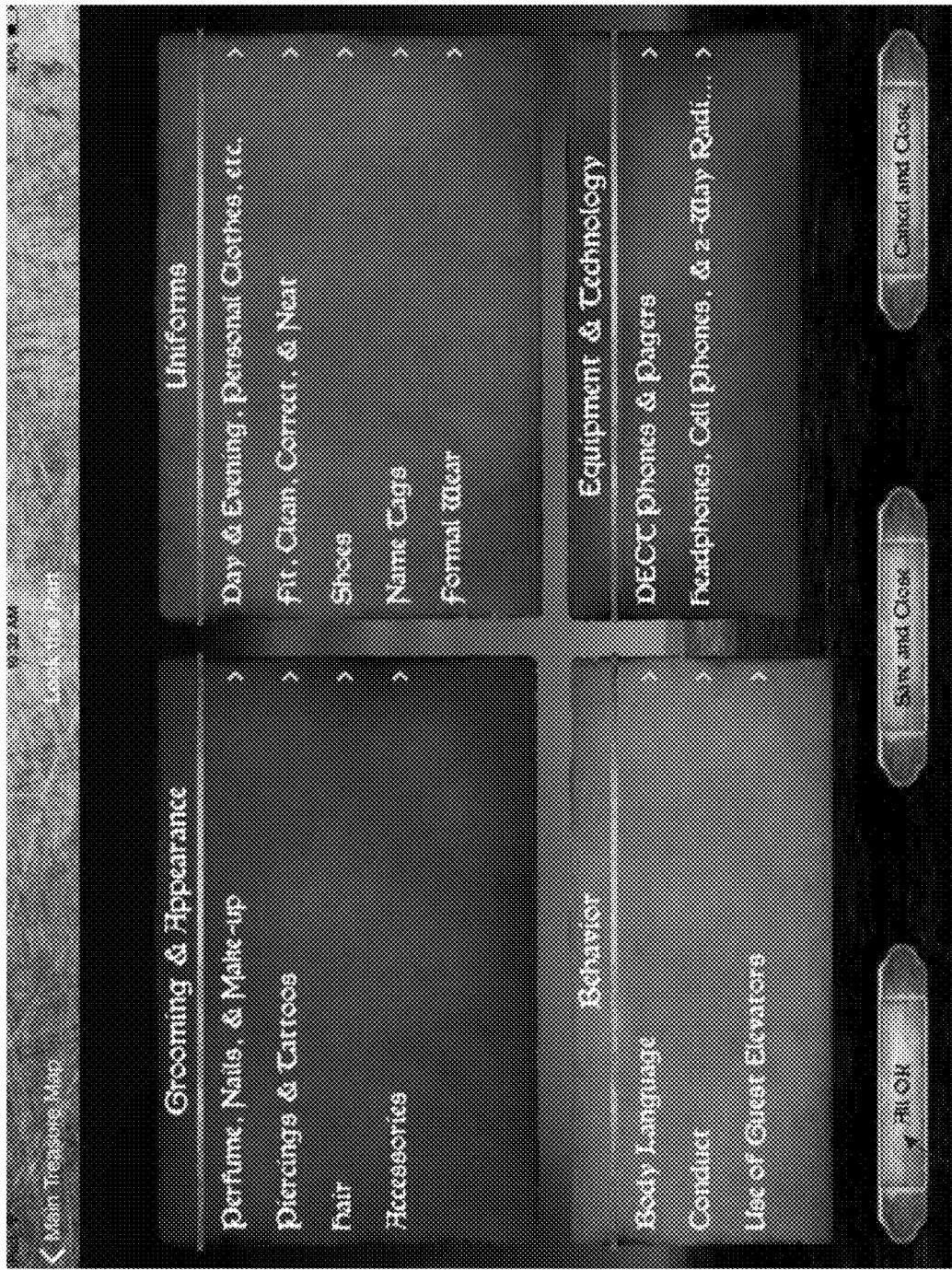
FIG. 11 presents exemplary audit element categories, in accordance with aspects of the present disclosure.

Creating an audit may include defining categories and sub-categories for audit elements. For example, FIG. 11 shows various categories such as Grooming & Appearance, Uniforms, Behavior, and Equipment & Technology. The categories may include sub-categories. For example, Grooming & Appearance includes a first sub-category "Perfume, Nails, & Make-up", a second sub-category "Piercings & Tattoos", a third sub-category "Hair", and a fourth sub-category "Accessories". An audit element may be placed in a category accordingly as desired by a creator user. Creating an audit may also include defining labels, tags, or parameters that may be identified, searched, pulled, or filtered according to a user input. For example, the various categories described above may be labels that may be searched or filtered, such as "Behavior" or "Uniforms". The labels, tags, and categories may be customized by a user via an appropriate user input such as a text entry input or via selecting various options. For example, an audit element may be labeled as one or more labels or tags in response to a user selecting various options (e.g. Uniforms, Behavior, Grooming & Appearance, etc).

Figure 12:
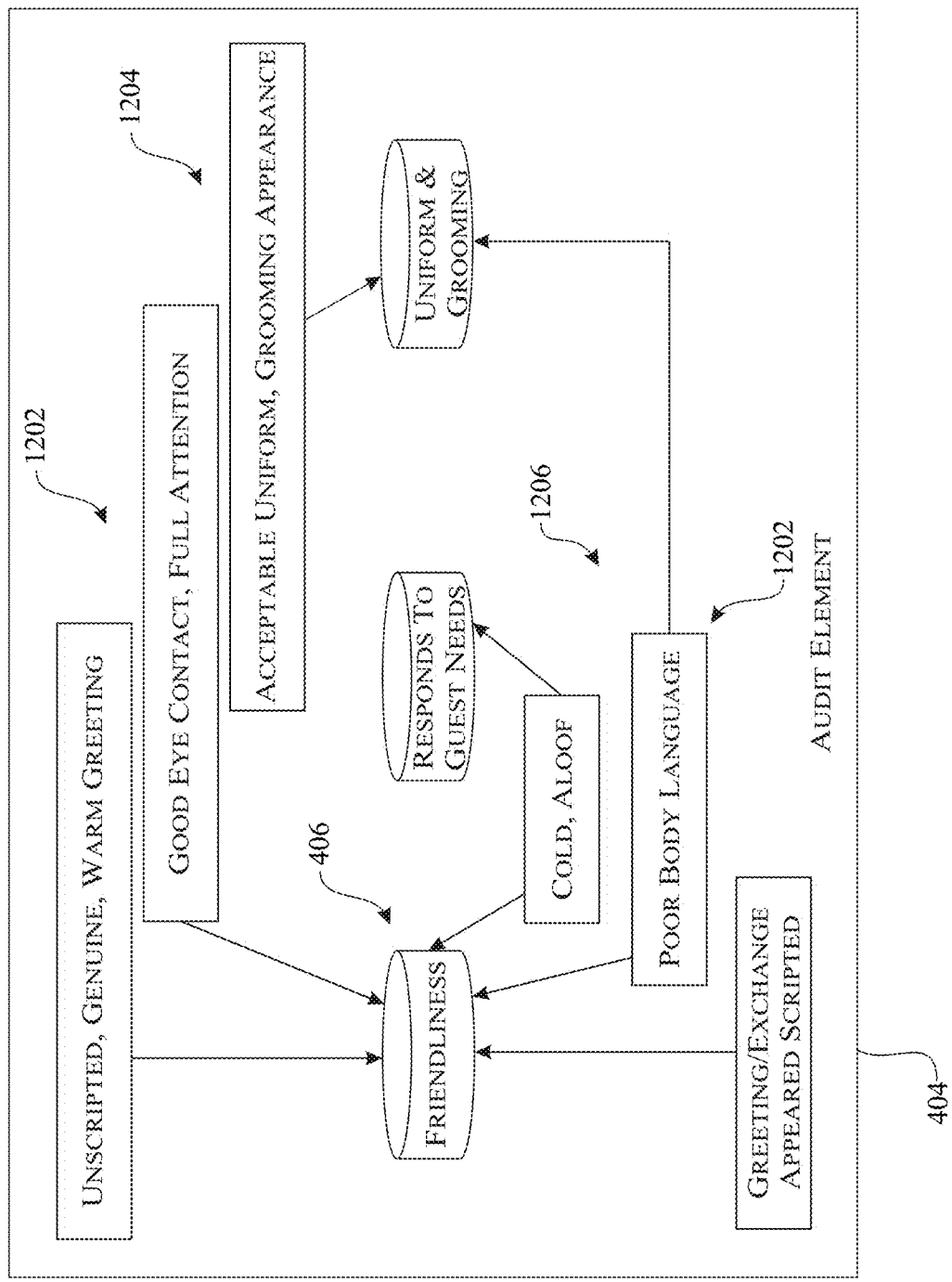
FIG. 12 presents an exemplary audit element and score categories, in accordance with aspects of the present disclosure.

Creating an audit may also include defining scoring methods for audit elements. For example, FIG. 4 shows an element score 406 being extracted from each audit element (e.g. audit element 404) such element score 406 is further described below. Further, score categories may be defined. For example, FIG. 4 shows three score categories 408 defined as "compliance score", "performance score", and "condition score". A creator user may define which score categories each audit element is linked to, the score categories being fully customizable. For example, an audit element may be "tagged" with one or more categories. A score provides a quantitative representation of the quality of an audit element upon inspection. For example, FIG. 12 shows scores being extracted from an audit element and placed into "friendliness", "responsive to guest needs", and "uniform & grooming" categories (which may be tagged). Such categories may also be tagged with parent categories. For example, "friendliness" may be tagged with a parent category of "compliance", "performance", and/or "condition". As such, any category in such a parent-child relationship may be tagged with a parent score category or a child score category.

Figure 13:
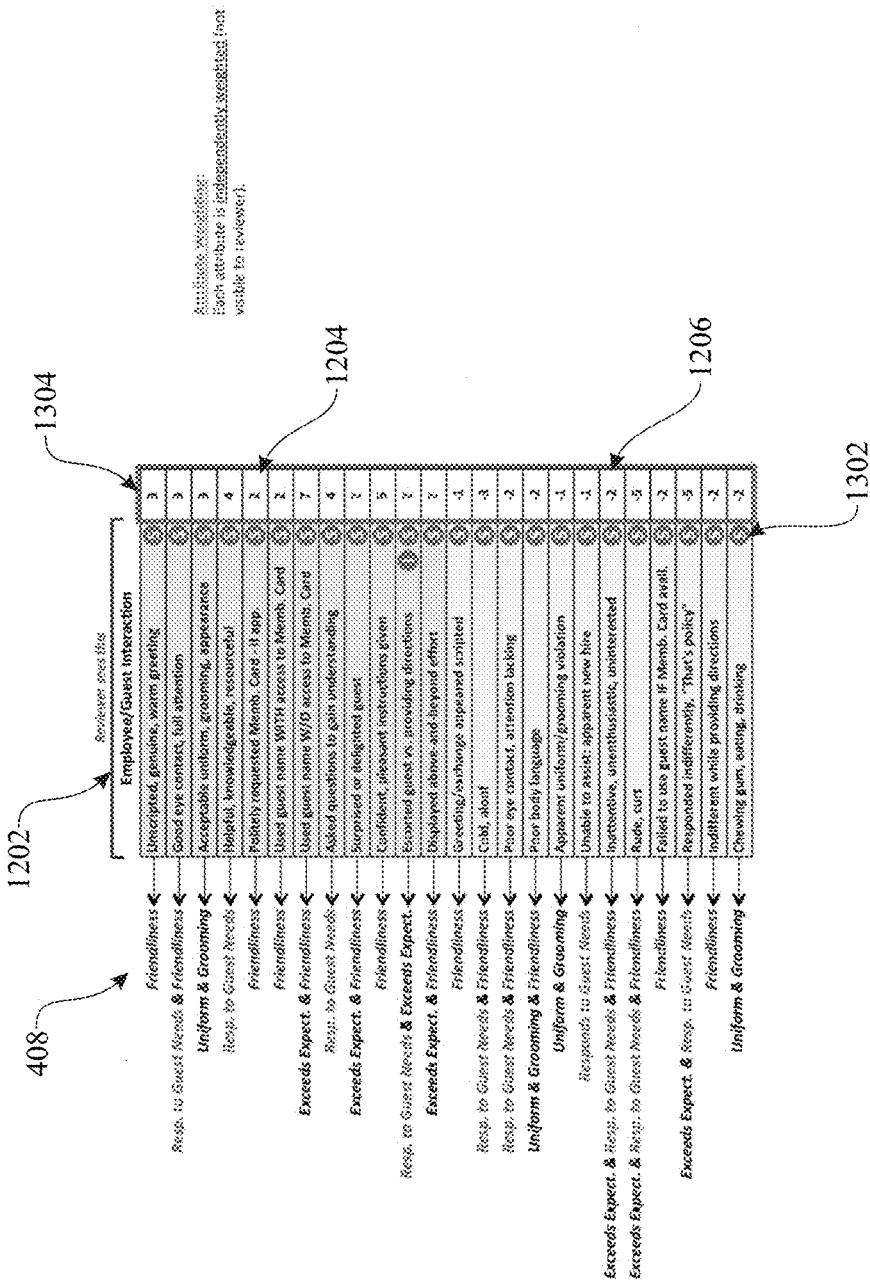
FIGS. 13-16 present exemplary attributes and subsequent scoring methods, in accordance with aspects of the present disclosure.
Figure 14:
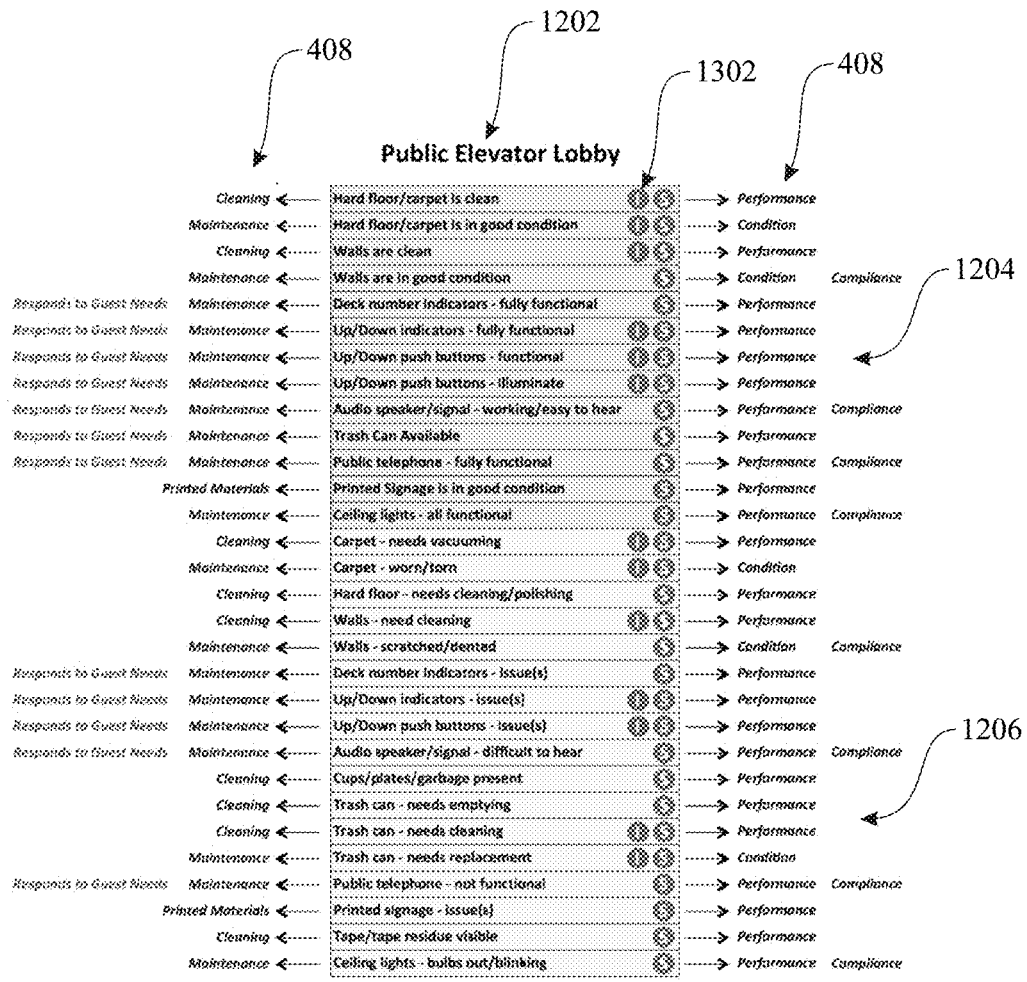

A value of a score may be determined or extracted in various ways as desired by an audit creator. For example, a set of attributes may be included in an audit element such that a user may select an attribute to either increase or decrease a respective score of the audit element, or to place a score into a respective category (e.g. via adding or subtracting points). For example, as shown in FIGS. 12-16, a set of attributes 1202 may be created by an audit creator and included in an audit element. The attributes 1202 may include positive attributes 1204 and negative attributes 1206, as shown in FIG. 13 by way of example. For example, user input responsive GUI elements displaying positive and negative aspects, elements, audit elements, attributes, in groups (e.g. a group of positive, group of negative) is defined herein as a Good/Bad screen. An audit creator may also determine a score weight 1304 as shown on the rightmost column of the attributes 1202 in FIG. 13. As such, upon selecting an attribute, a score may be updated, generated, or changed according to the score weights. For example, upon selecting the "Unscripted, genuine, warm greeting" attribute, three points may be added to the element score 406. On the other hand, if one were to choose the "Cold, aloof" attribute, three points may be deducted from the element score. As such the element score may be a negative number. But, in some embodiments the element score may have a minimum of zero. An auditor may or may not be presented with these score weights, as they may be hidden as desired by an audit creator. FIG. 13 also shows exemplary score categories on the left hand side of the attributes, which may or may not be hidden from an auditor upon the audit being presented. For example, such attributes may be tagged with various categories as described above. As shown in FIG. 14 each of a plurality of attributes 1202 are tagged with various categories (e.g. score categories). For example, the attribute "Deck number indicators—fully functional" is tagged with "Maintenance", "Responds to Guest Needs", and "Performance" categories. It is to be understood that any category may be configured to have a parent category and/or a child category. Parent-child relationships of such categories may be defined by an audit creator. As an example, as shown in FIG. 12, selecting the attribute "good eye contact, full attention" provides points or a score to both "Friendliness" and "Responds to Guest Needs" categories. As such, an audit creator defines which category a score or a point is assigned to. Further, an audit creator defines a number of points or a weight that each attribute contributes to a score or score category.

Figure 15:
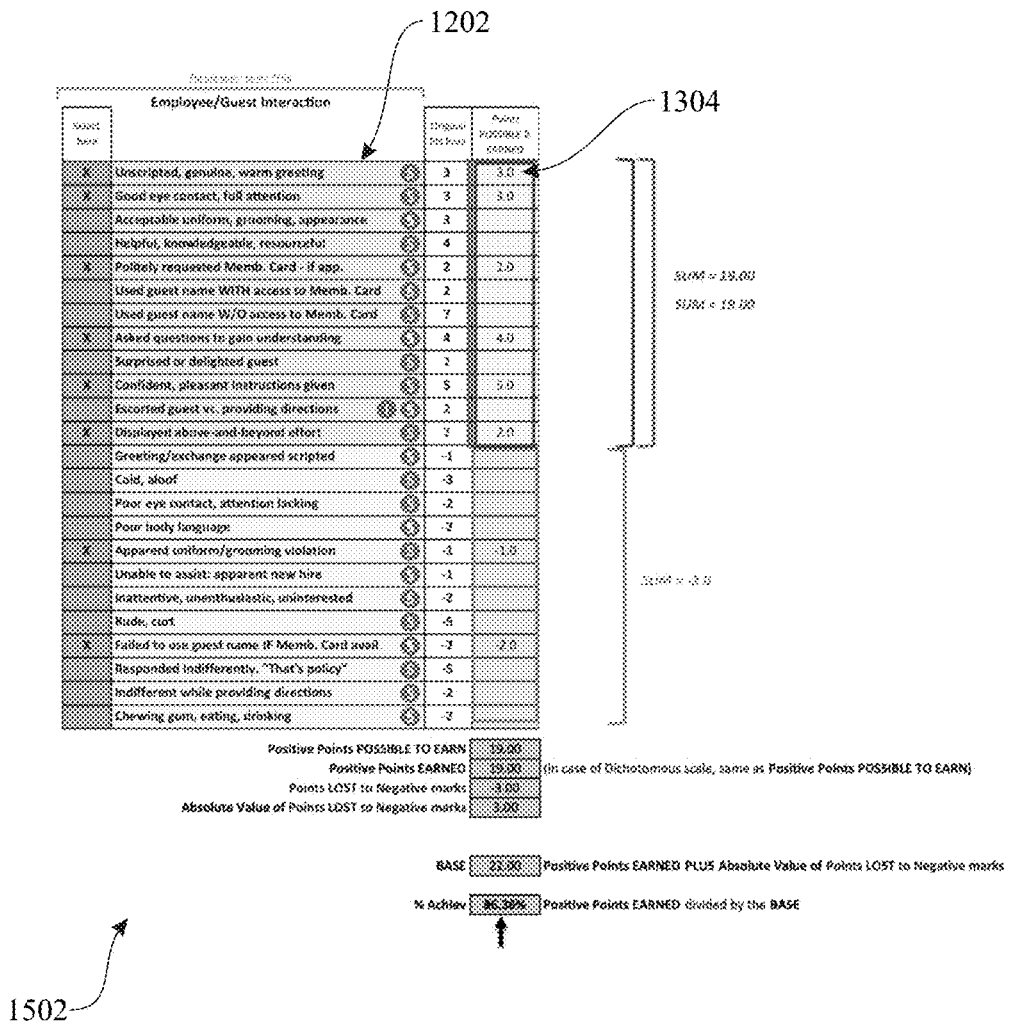

A score may be generated or determined in a particular way. For example, as shown at score calculation 1502 in FIG. 15 a total of all positive points earned is determined by summing the positive points. Further, an absolute value of a sum of negative points is determined. The absolute value of the negative points is summed with the positive points to generate a base value. The total positive points earned is then divided by the base value to determine a final score of the audit element. For example, the final score may be included in or take form as the element score 406 of FIG. 4. In the example of FIG. 15, the positive points earned is 19, the absolute value of the negative points is 3, which results in a base value of 22, and a final score of 86.36%. It is to be understood that any appropriate scoring calculation may be defined by an audit creator. In some audits, assigned weights for an audit element may be treated as "null", causing the assigned weight to be ignored for a given question, checklist, attribute, or element and removed from consideration during scoring. In some embodiments, "null" treatment of an element may exclude an attribute or audit element from being scored, or contributing to a score category. For example, treating values or weights as "null" may exclude a particular score of an audit element from being a function of the base score as shown in FIG. 15. An attribute or audit element labeled as null may have their pre-assigned or pre-defined weights treated as "null" during scoring. In some embodiments, attributes or elements may be specifically identified as having the potential to be treated or scored as "null" depending on the auditor's selection or lack of selection (as appropriate) of a given attribute or element during the course of an evaluation or observation. As such, a null score, ore treating an element with a null score indicates that the respective item is removed from any scoring implication. This approach ensures neither a "credit" nor a "penalty" occurs for items or aspects that are desired to play no role in determining or calculating a score for a given element. Such a null scoring function provides a way for users to select and score only certain items to count towards a parent score. In some instances, unselected attributes may be treated as "null" with no scoring implication. However an auditor may not be limited to such approach and the system may be configured to treat unselected attributes or features as a sign that their performance was sub-standard and score them accordingly. As such, a lack of selection may play a role in generating a score, and the null scoring function does not in certain embodiments, need to be employed.

In some embodiments, audit elements or attributes may be defined as having an "exclude from calculation of base" feature or tag. For example, this approach may be used to capture information relating to "above and beyond" effort or performance exhibited during an observation (e.g. via a checklist, or via screens presented in the figures). For example, when an attribute is excluded from a calculation of a base value, respective points possible is excluded from a calculation that determines the base value as described herein. As such, positive behavior may be awarded to subjects without penalizing employees (or audit elements) for achieving only a percentage (or a maximum value of) of a highest score possible for the given audit element.

In some embodiments, attributes or audit elements may be defined as being mutually exclusive with respect to other attributes or audit elements. For example, in a checklist or in a good/bad screen (shown in FIG. 13) an auditor may be prevented from selecting related attributes that conflict with one another. For example an auditor may be prevented from selecting both "unscripted, genuine, warm welcome" and "greeting/exchange appeared scripted", since these attributes are mutually exclusive by common logic.

Scores gathered from a child audit element (sub-element) may be applied specifically to a parent audit element. For example, a specific "rollup percentage" may be selected to cause only a certain percentage of a score be applied to a parent audit element. A sum of all assigned rollup percentages for child audit elements of a given parent audit element may equal 100%. The rollup percentage stipulates how certain scores from a given child audit element applies to the calculation of a parent child element score.

Figure 16:
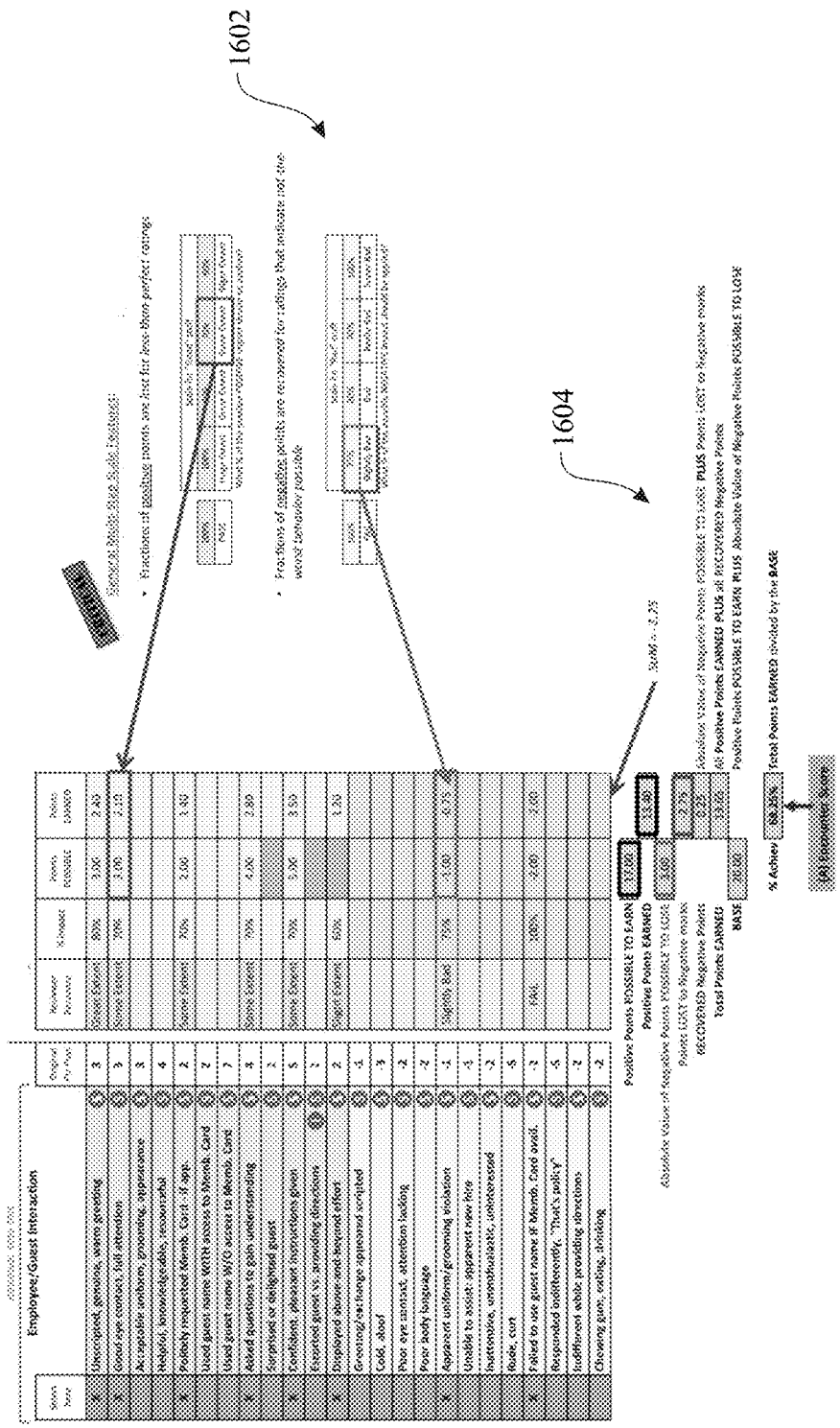

A creator user may define a scale for determining a score of an audit element. For example, a scale 1602 may be included in an audit element, as shown in FIG. 16. More particularly, the scale 1602 includes a plurality of quantized degrees, such as "Huge Extent", "Great Extent", "Some Extent", or "Slight Extent". Each degree may be associated with a percentage, the percentage configured to modify, determine, or affect the number of points an attribute or audit element receives (e.g. element score 406 or any score category). For example, "Huge Extent" may be associated with 100% and "Great Extent" may be associated with 80%. As such, if an auditor selects "Huge Extent", 100% of a maximum possible points for an attribute will be included in a score for a respective audit element or attribute. As another example, if an auditor selects "Some Extent", only 70% of a maximum possible points will be included. For example, eye contact attribute 1604 of FIG. 16 is shown after an auditor selects "Some Extent". As such, 70% of possible points will be awarded to this attribute (or category) as 2.10 points. On the other hand, for negative attributes, such a scale may indicate a degree of negativity, such as slightly bad, bad, really bad, or super bad, as shown in FIG. 16. As such, a 75% "Slightly Bad" degree will reduce the negative impact of a negative attribute on a maximum possible score by %25. In other words, 75% in a negative scale may provide only 75% of a total negative impact (i.e. negative points). A score may be calculated similarly at score calculation 1604 by taking into account partial points caused by a user selecting degrees in scale 1602.

Scales of various configurations may be included in an audit. For example, a "Goldilocks Scale" may be included to allow a user to conveniently score an audit element as "Way Too Little" through "Just Right" and all the way to "Way Too Much" in a single question or response. For example, the Goldilocks Scale may run from 0% to 100% to 0%. The Goldilocks Scale may have various variations, such as having a range of 25% to 100% to 25%. As such, the Goldilocks Scale displays a highest score in the center of a selectable spectrum, with two minimum values on each side of the highest score. Any appropriate values may be chosen in a Goldilocks Scale, having two minimum values each side of a maximum value. It is to be understood that any appropriate input method may be included for receiving a user selection of a scale. It is to be understood that any appropriate input method may be included for receiving a user selection of a scale. For example, a user may be presented with a virtual "slider" such that the user may slide their finger over the "slider" as a finger-slide entry. Such a finger-slide entry provides a way for continuous scoring rather than quantized or discrete scoring tiers. Further such a finger-slide entry provides a high degree of precision and accuracy, providing values having several digits beyond a decimal point. For example, a finger slide entry may provide low uncertainty if a user needs to choose a value with a high number of significant digits. For example, the finger slide entry provides scores such as 3.4789 as opposed to discrete 3.0 or 4.0 scores. An auditor may be unaware of how many significant figures are present in a score, and a value such as 3.4789 will add 0.4789 to a score that would otherwise be unavailable in integer scoring methods that contribute 3.0000 or 4.0000 to a calculation. The finger slide approach provides a fast data collection method since the auditor does not need to "decide" between integer choices/responses. As such, an auditor simply needs to move the slider to where the input "feels right" to them, requiring less mental energy for deciding.

In some embodiments, a checklist may be defined by an audit creator. For example, such a checklist may include a list of items that may be checked such that a total number of checked items generates a score for the checklist. For example, a percentage or number of checked items may contribute to the element score 406, or a score for any audit element. Such a checklist may be an audit element, or may be subsequently presented in response to a user selecting an attribute.

Checklists may be configured in various ways by an audit creator user. For example, in some situations, an auditor may be presented with an overwhelming listing of attributes (or audit elements) to select from. As such, a checklist may be configured to select and provide questions or attributes that have a greater (e.g. aggressive) impact on a score, or respectively more aggressive weights to effectively score, or obtain a reading on an audit element or audit environment. For example, 72 different questions may be askable to a user relating to Grooming & Appearance standards at any one time. Therefore, an aggressive checklist may isolate a sub-par performance of only one or more attributes in a large volume of attributes and the scoring weights or impacts may be inflated or increased for the sub-par performance to effect a score of an audit element (e.g. total score). Such an aggressive model provides a more detectable assessment of important items given a large volume of potentially scorable audit elements or attributes. For example, a few attributes may be defined to have an inflated impact on a score as either being sub-par or above expectation in performance. In some embodiments an aggressive checklist will use a modified base value to calculate a score. Such an exemplary base value is shown in FIG. 15. Any of the various scales described herein may be used in such an aggressive checklist. As such, the aggressive approach inflates the scoring impact of a few selected attributes. In some embodiments, the aggressive checklist includes a high volume of attributes or elements.

A checklist (e.g. an aggressive checklist) may be configured to receive a user selection (e.g. creator user) to flag an audit element or attribute, or any parent or child element, to be treated as "null" under specified circumstances (e.g. via a null scoring function as described herein). However, it is to be understood that the null scoring function is not limited to be applied to checklists. For example, attributes that are not configured to apply to a normally assigned score may be flagged by an audit creator or developer (e.g. content designer). An audit element or attribute tagged with "null" would provide neither a positive nor a negative scoring impact, having no effect on scoring. An audit element may be treated as "null" upon the system detecting a lack of response from an auditor, as a non-limiting example. For example, on a given checklist or for a given audit element, selected and unselected attributes or features may be handled differently as defined by a user. For example, as defined by a creator user, a lack of selection may affect a score without applying the herein described null scoring function.

Questions may be presented in various ways. For example, in an "in-line" screen, a group of related questions each with their own scale for an auditor response may be displayed simultaneously on the user device. Such an in-line or streamlined display method promotes speedy preparation and data collection since all relevant questions may be displayed in a truncated or streamlined fashion, requiring no excessive tapping (e.g. tap-to-reveal-scales). Responses to questions may be received via an appropriate scale (e.g. customized scales). Questions may be presented such that an auditor may pick and choose a sequence in which the auditor answers the questions. This may be beneficial when a salad bar is being evaluated and an auditor is tasked to score sub-elements of a salad bar (e.g. lettuce, tomatoes, tofu), where an auditor may conveniently address such elements presented in a streamlined group of questions, items, or audit elements in any order. This allows an auditor to maintain a low profile and reduces a required number of user inputs to score an audit element.

Figure 7:
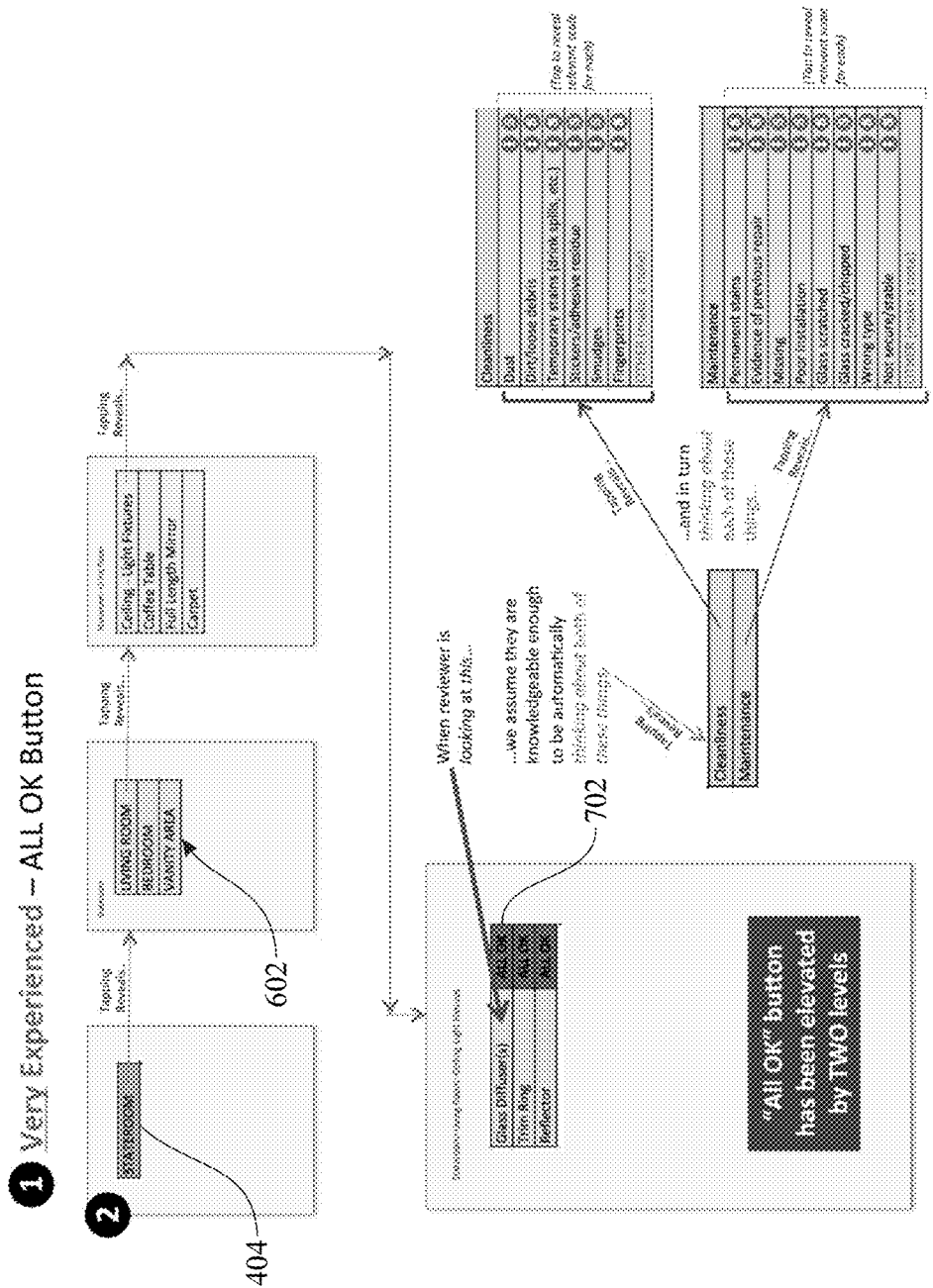

Turning back to FIGS. 6 and 7, an "ALL OK" button may be included in an audit. For example, the "ALL OK" button may be operative to automatically approve or indicate the quality of all child audit elements, categories, or attributes being satisfactory. As shown in FIG. 7, an all OK button 702 is included at category "Glass Diffuser(s)", and upon operation, all child elements, cleanliness, maintenance, dust, dirt/loose debris, temporary stains, etc. will be automatically indicated as being satisfactory, and an appropriate score may be applied. Such an all OK button 702 may be included at any level of a parent-child relationship described herein. An audit creator may define at which level the all OK button 702 is presented. For example, a more experienced auditor may be presented with an all OK button 702 at a higher level of a parent-child relationship. On the other hand, a less experienced auditor may be presented with an all OK button at lower levels, or in some embodiments, not at all. For example, auditor profiles including audit history information may be stored on the audit database 112, and such audit profiles may be considered when creating an audit, or when determining an appropriate level for the all OK button 702. For example, an audit profile may be defined as "novice", "experienced", or "very experienced". As such, an audit may be automatically matched with an auditor profile before being sent to an auditor device. Upon selecting an all OK button, all points or scores for child elements will be included in determining a final score. For example, an all OK button may automatically check all checklists and select all positive attributes of an audit element, and disregard all negative attributes (or answer all questions positively) providing a maximum positive score for all child elements. Alternatively, an "All not OK" button may provide an opposite effect. The auditor profiles may be stored on the database and may include data or information that identifies an auditor (auditor ID information), auditor experience (e.g. "level"), auditor input history (e.g. completed audits, statistics, accuracy, productivity). The auditor profiles may be used to generate a custom audit for individual auditors. For example, the creating step may create, develop or generate customized audit elements or audits for individual auditors based on respective auditor profiles as described herein. Such customized audits may be sent to a user device for being presented to an auditor.

Creating an audit may also include defining guidance buttons 1302 as shown in FIGS. 13-16 as "S" buttons and "I" buttons. Such buttons may be operative to present text relating to an attribute, audit element, or category. For example, an audit creator may enter text descriptions that are presented to a user when the user selects guidance buttons 1302. The guidance buttons 1302 may be customizable by a creator user. For example, an "S" button may provide information on company standards, and an "I" button may provide information on instructions, upon being selected. For example, an "I" button may provide instructions on how to check temperature of a food item via a temperature probe, or an "S" button may provide company standards relating to dress code. For example, the "S" and "I" buttons may present diagrams, photos, images, videos, audio and/or text in response to a selection input. It is to be understood that various buttons, links (e.g. hotlinks), or hotkeys may be included or defined. For example, FIGS. 8 and 9 show hot-buttons 804 customized or defined to navigate a user to a particular screen, or to present various options or audit elements. For example, the "EOV" (End of Visit) hot-button may display a set of audit elements that a user must pay attention to during their visit at a venue such that the user completes these audit elements at the end of their visit. As another example a "special day or period" hot-button may present audit elements that require completion at a particular time or via a particular schedule. As another example, a hotkey may be selected to present any of the herein described audit elements or a Q&A session template to quickly take note of an audit element. For example, a user may want to quickly take note of a Q&A session with an employee, and as such, the user may select an appropriate hotkey to present a GUI element for the Q&A session.

The terms hot button, hotlink, hyperlink, and quick access button may be used invariably throughout the present disclosure. However, in some instances, "hot button" may refer to buttons to provide an outlet for auditors to record information. For example, observations out of context from any specific tool-assigned audit content may be recorded via hot buttons. As another example, an auditor may witness a circumstance (e.g. "I just witnessed the most amazing interaction between a crew member and a guest, the guest was thrilled!", or "That Officer's Pants are 3" too short, he looks awful!"), then as a result of the auditor's desire to immediately record their impression of the circumstance, the auditor may select a hot button. Upon selecting the hot button, the system presents or displays a screen appropriate for recording the observation. Data collected via hot buttons may be configured to provide a reduced impact on the scoring of an audit or audit element. Hot buttons may be fully customizable for a particular venue or business. One or a plurality of hot buttons may be included linking to different data capture methods, locations, screens, questions, checklists, or any element that may be presented to an auditor.

A quick access button may be referred to more particularly as an icon button that is a hyperlink to a given function such as a timer, specific data capture method, or specific audit content.

In some embodiments, creating an audit may include defining text entry fields for receiving text input from an auditor user. For example, an audit may prompt an auditor user to enter text for a particular audit element. Further, microphone input for voice commands may be presented to an auditor user. In some embodiments, voice-to-text functionality may be included to generate written descriptions. As such, a microphone or video capture device may be included in an auditor device. Furthermore, video or photo input may be defined such that an auditor must take a photo or video via a camera device to complete an audit element. As such, the auditor device may include hidden cameras or microphones.

Creating an audit may include determining an estimated time to complete an audit, audit element, or estimating a time to answer a question, complete a checklist, or select an attribute. Such an estimated time may be determined via analyzing historical data of audits completed by an auditors. In some instances, such an estimated time may be determined via experimental methods such as by presenting audits or audit elements to a mock user and receiving a time for completion. For example, a "play mode" may be selected by an auditor or audit creator to create a mock experience of an audit for training purposes. Such an estimated time of completion may be considered when assigning an audit to an auditor, or when creating an audit. For example, an audit may be created for a cruise ship auditor, requiring a specific time frame. As such, an audit may be tailored for a particular application or a total audit time. In some embodiments, actual audits may be used to generate historical audit data (e.g. audit times, scores, problems, troubleshooting, tags, etc.) In some embodiments, the estimated time remaining may be determined by one or more of assigned time values for each question or checklist item, assigned varying numeric factors to each potential tags (e.g. EOC—Long Time, EOA—Easy) for each of the four metrics described above, and/or using tracked time and date data received or received from an auditor device as audits are conducted (e.g. historical data).

Play mode may be used to allow new auditors to play or experiment with the auditing system, or with developed, created, or generated audits that are presentable via the user device. In some embodiments, activity derived through play mode may be excluded from calculations of time required, or any historical aspect. After the play mode is desired to end, an auditor may select an option to "score for real" where the auditor may use a "reset audit" function to clear the system logs and audit history acquired via the play mode to revert an audit to a clean and un-scored starting position.

A creation GUI may present various selection boxes, text entry forms, scales, sliders, finger swipe GUI elements responsive or operative to a user finger-swipe input, icons, symbols or the like configured to receive a user input for creating an audit as described herein. For example, integer scoring buttons or discrete scoring GUI elements (e.g. +1, −1, 3, 5 etc.) may be presented for receiving a user input and assigning a specific user input as a score. For example, a user selecting "+1" may assign one point to a particular score category as described above. For example, a user input may be received to select an option for creating and defining the elements above. The above features of an audit may be defined during the creating step 202. The audit creator 108 is configured to present such a creation GUI and execute the various audit creation features described herein (e.g. defining an audit, audit elements, attributes, checklists, etc.)

As such, the creating step 202 develops, creates, or generates audits or audit elements as described herein. For example, the creating step 202 develops audit elements and stores audit elements in the audit database 112. The audit database is a relational database holding all information on created audit elements (e.g. questions, checklists, scales, scoring categories, scoring weights, custom queries and reporting). Such a relational database may also include information for targeting audits to particular users or clients (e.g. businesses). For example, United States Public Health (USPH) content may be included for targeting content to hotels, restaurants, spas and cruise ships. In some embodiments, a creator may develop two versions of an audit: a full version, and a truncated version, the truncated version being more brief and focused to increase auditing speed and efficiency.

Further, the relational database (audit database 112) is updated in real time to provide a dynamic, customized, effective database for creating and providing audits to auditors. For example, data may be pulled from the database to provide, supply, send, or create a customized audit for a particular auditor (e.g. for a particular auditor profile) or a particular venue as described herein. As such, the creating step may include a two tier approach, where a first tier includes the audit database being updated with created audit content (e.g. audit elements) and a second tier includes pulling data from the audit database to create a customized audit for a target user or venue (e.g. a cruise ship). In some embodiments, a log may be accessed for creating a customized audit. For example, Turning back to FIG. 2, the audit presenting step 204 includes presenting an audit and subsequent audit elements to an auditor user (e.g. created or defined audits and audit elements). For example, an audit may be sent to the auditor device 104 for being displayed via a display of the auditor device 104. The audit elements may be displayed in a "display order" that is defined by a creator user or any appropriate user. For example, particular audit elements may be excluded or included in a certain order when displaying or presenting an audit to a user. Further, in some embodiments, audit elements (e.g. questions, checklists) may be always presented in an audit, and this feature may be selected by an audit creator as "ask every time" elements. Further, in some embodiments, audit elements that previously returned a poor score (e.g. passing a score threshold) may be included in a subsequent audit. For example, the audit content 116 shown in FIG. 1 may be sent to the auditor device 104 and stored locally on the device for being presented. Presenting an audit may include presenting one or more of the above described elements via a GUI. For example, the audits, audit elements and subsequent attributes shown in FIGS. 1-16 may be presented to a user. Further, interactable and selectable icons, buttons, text entry fields described herein may be presented. An appropriate user input (e.g. a click via a mouse pointer, or a tap or swipe on a touch-screen display) may select various options described herein. For example, an appropriate user input on such interactable GUI elements may cause data stored on the various devices or on the audit database 112 to change. For example, a user input may select one of the above described attributes and a score may be applied appropriately by changing audit data stored on the audit database 112. In some embodiments, audits may be stored locally on an auditor device and as such a user input would cause local data to change accordingly. Presenting an audit to an auditor user may also include presenting a percentage complete (% complete) value to indicate a percentage of an audit that has been completed. For example, a number of audit elements completed divided by a number of total audit elements may be included in such a percentage. The percentage complete value may include calculations of a number of questions or checklists completed or answered of a total number of questions or checklists assigned to an auditor. Presenting an audit may include presenting important audit elements, which may be termed "Weasels". For example, a "Weasel" may be an audit element that exists in conditions where there is a likely opportunity to effectively evaluate or inspect the audit element in a plurality of locations, such as the cleanliness of a carpet or general odor of a room, and may be abruptly presented to an auditor at a randomly selected time. Such "Weasels" may be defined in the audit creating step 202. Further, "Unicorns" may be defined and presented to an auditor. "Unicorns" are special audit elements that may be rare to come by, such as a rare employee-guest interactions. Such "Unicorns" may be provided to a user via a GUI element (e.g. a hotlink) available at all times such that the user may be reminded of such special unlikely events that must be observed. A number of "Weasels" or "Unicorns" for a given audit may be defined by an audit creator (e.g. via one or both of the herein described randomization or "the ask every time" methods.

The "ask every time" elements may be presented in different ways. For example, in one embodiment, every time an audit is developed, created and/or pulled, such "ask every time" questions may be included. As another example, "ask every time" questions may be asked every time a user enters a particular area or zone as determined by the GPS subsystem. Further, the various statistical considerations described herein may be taken into account to select or present such "ask every time" questions via an audit. The "ask every time" questions may be defined during the creation or development stage (or when the audit is being "pulled" by a user from the server). For example, the system may randomly select zones/locations for a given audit, and at that time, based on the selected zones/locations, the "ask every time a venue/location is selected" flagged questions/checklists may be pulled or included in the given audit.

The capture step 206 includes forming or capturing the captured data 118. The captured data 118 shown in FIG. 1 may be data formed by, or subsequent to auditor user inputs. For example, the captured data 118 may be a collection of selected attributes, checklist items, checklists, text entries, video or audio entries, scores or points, or answered questions as described herein. Further, such captured data may be categorized via the score categories or the audit element categories as described above. The captured data is sent to the audit content server 102 for storage, evaluation, and/or analysis. In some embodiments, the capture step 206 includes receiving data from physical data signatures (e.g. machine readable ID tags), or receiving data from external probes such as temperature, infrared or microorganism detectors or sensors. For example, such an external probe may be hard-wired to the auditor device or may be wirelessly networked via Bluetooth systems. As such, an audit element may request the auditor user to capture data via such an external probe (e.g. temperature of coffee, or microorganism count). In some embodiments, an auditor may freely navigate an audit or a location (e.g. a cruise ship) and freely drive themselves to various audit elements to capture data (i.e. an auditor-driven approach). Further, any custom or additional content added by an auditor described herein may be incorporated in such an auditor-driven approach. For example, an auditor may drive themselves to an audit element and further add zones, sub zones, audit elements, attributes, and various sub elements to the audit element as described herein to expand, evolve, update, or modify a given audit.

The captured data may include location data for locating an auditor device. For example, an auditor device may include a GPS transmitter that provides the audit content server 102 with GPS data for locating the auditor device. The GPS data (GPS data 122 of FIG. 1) may be mapped on any of the above described maps for guiding an auditor user. For example, in creating an audit, a route may be defined and presented according to the GPS data for guiding an auditor to various audit elements. In some embodiments, the GPS data 122 may be processed to send, audits and audit elements to auditor users according to their location. Wi-Fi positioning systems or methods, or any appropriate device locating method known in the art may be included for determining the location of the audit device. For example, turning to FIG. 10, a user is determined to be in the Lounge/Library area at user location 1002 (shown via a circled "X"). As such, the audit may present to the auditor user various audit elements in a vicinity of the auditor user to maximize efficiency. For example, an atmosphere of the Lounge/Library location may be included in an audit element, and as such, the auditing system may present questions, checklists, attributes to the user about the atmosphere. As another example, various audit elements located in the Lounge/Library may be presented to the user such as nearby chairs, picture frames, ceiling fans, etc. Such location data may be recorded and stored on the database for further analysis (e.g. in real time). In some embodiments, Dijkstra's shortest route algorithm may be included in machine readable instructions for presenting a shortest route from a user's location to one or more audit elements. All captured data via an auditor device may be timestamped or location stamped for future evaluation and analysis. In some embodiments, machine-readable identification tags (e.g. physical identification devices) may be scanned for capturing employee or item identification data via the auditor device (e.g. via a scanner or camera) and cross-referenced with ID data stored in the database (e.g. employee profiles, item profiles, audit element profiles, object profiles, venue profiles, etc.). As such, an auditor may keep track of which employees were inspected or interviewed (e.g. as an interviewee). Audio or video recordings may also be cross-referenced with the employee ID data. Further, image, video or audio files may be played via the user device and presented to an auditor or an employee for training purposes. For example, if an employee is determined by an auditor as being ungroomed, the auditor may select a training video to be played such that the auditor may show the ungroomed employee a proper grooming example.

An interviewee such as an employee may be tracked and/or validated. For example, specific content of audit elements or audits may be tagged with a specific interviewee. Such an interviewee tag may be used to pull all content relating to the specific interviewee (e.g. employee). Further, once the content is pulled and loaded onto a user device, an auditor may "filter by" and/or "select and display all" of audit content for a given interviewee, thus allowing an auditor user to complete an evaluation efficiently in one session. For example an interviewee may be a Chief Mechanic or a Stockroom Manager as non-limiting examples. As such, an auditor may evaluate and score particular employees efficiently. Similarly, documents, systems, or logs may be evaluated, tracked, or validated as described with respect to the interviewee above. For example, such systems, documents, or logs may be a maintenance system of a hotel or cruise ship, a guest satisfaction log, or various documents.

In some embodiments, the capture step 206 may include receiving an input from an auditor user for creating custom audit elements (e.g. new areas (zones), sub-areas (sub-zones), rooms, objects) that were not present in a created audit. As such, GPS data may be utilized and cross referenced with the custom audit element and stored in the database or locally on the auditor device. As such, audits in the database may be adjusted in real time upon confirming the validity of such custom audit elements. For example, confirming the validity may include cross-referencing multiple auditor user inputs relating to such a custom audit element. The validity of the custom audit elements may be determined after audits are completed or via results analyzer 110. Further, an auditor may tag observations or audit elements with pre-defined or auditor-created tags. For example, an auditor may be instructed to tag audit elements with a particular metadata tag via an appropriate user input such as text entry or a screen tap selecting an option from a drop-down list. Furthermore, an auditor user may be presented with a "re-score" option to re-score an audit element.

In some embodiments, the system may be configured to pull an audit prior to an auditor going into an auditing environment (e.g. a field). The auditor may be tasked to evaluate what has been pre-selected and pre-populated by the system. In another approach, the auditor may head into the field with a "pre-selected and pre-populated" audit, but is permitted to add zones, sub-zones, and sub-sub-zones in a parent-child relationship with respect to adding locations, areas and zones of an auditing environment for audits and audit elements. For example auditors may provide a user input to add a zone or to request that a zone be added. Auditors may request or add any appropriate element described herein (e.g. attributes, audit elements, checklists, tags, flags, etc.). For example, an auditor may request to add a chair.

Text entry fields, scales, or selectable attributes may be presented to a user who wants to report a good thing or a bad thing (e.g. via a GUI element such as a button). More particularly, a "good" button and a "bad" button may be displayed to an auditor. An auditor may then report something they witnessed during an assigned observation that the auditor felt was significant, but that were not presented among the listed questions, checklists, attributes or options. Tapping one of these buttons leads to a sequence. The sequence may include first displaying a text-entry box for receiving a text entry input from an auditor which provides qualitative implication to the audit element. Second, a dichotomous or multi-step scale may be presented to the auditor for indicating a level of quality (e.g. how good or bad), providing a quantitative implication for the audit element. Such text entry combined with a scale entry provides an effective way to modify and evolve an audit for future revisions as the text entry may be included as a note to audit creators or clients. Such a note may be saved on the database appropriately and associated with a particular audit element.

The capture step 206 may include capturing data via a "pub session". A pub session is a presentation method for conducting an audit from afar, and is intended to capture typical behavior, appearance, or performance according to special randomization parameters. This "distanced" approach provides a low-profile method of capturing data from an audit element or venue. As such, the pub session prevents employees/customers from being placed on alert by maintaining anonymity and secrecy of an auditor. The pub session approach is well suited for auditors who are asked to audit while visiting or vacationing. A pub session may be conducted while an auditor is sitting at an outdoor table while their user device is used to casually record observations and scores of audit elements. The audit content may be focused for a particular pub session to provide easily scorable items that do not require extensive tapping. As such, the finger-slide method is well suited to be included in a pub session approach. The nature of a pub session provides randomized scores since naturally a person will be surrounded with random events that could be evaluated at a quick glance. A pub session is well suited for a cruise ship environment for evaluating crew member grooming & appearance and body language/behavior which may be observable from afar. However, pubs sessions are not limited to cruise ships and may be applied to any appropriate situation. Such a pub session may be started upon a user selecting a quick access button or hyperlink. In some embodiments, auditors may be asked to evaluate things that occur multiple times in a given location/venue/destination/function. For example, in a large public lounge, an auditor may encounter many chairs (often of different styles), couches, and other features (e.g., framed artwork, windows). Rather than ask the auditor to "evaluate the condition of the chairs in the lounge" (which may yield useless, homogenized, single scores), the system provides the means by which an auditor can focus on a single feature (e.g., chair, art piece) at a time, evaluating it in isolation, using a standardized checklist, or other data capture method (e.g. checklists, in-line screens, good/bad attribute screens, ALL OK method, questions, aggressive checklists/scoring). Through multiple observations, and composite scoring (scoring to categories), the system is able to calculate a "score" for the "chairs in the room." During the initial content design phase an audit creator may stipulate the minimum effort (number of observations) expected from the auditor; the system may make a provision for them to "add more" if they wish (or if they feel the actual situation requires additional observations). An observation is defined as answering/completing a question, checklists, scales, selectable attributes, or any GUI element presented to an auditor user. A cycle/session may include an "x" number of observations, x being a variable integer. When an audit creator anticipates one of these "multiple units" scenarios (e.g., chairs in the lounge), the system stipulates the minimum number of "sessions/cycles" to be assigned (tool-driven). The system also determines the maximum number of "sessions/cycles" we'll allow the auditor to "add-on-demand" (auditor-driven). The same holds true for the number of observations that are assigned (the minimum assigned, along with the maximum that can be added by the auditor in the field). These functions are independent and customizable. An audit creator could design the content to require a minimum of 6 sessions/cycles, with a maximum of 10 sessions/cycles, each with a minimum of 3 observations, and a maximum of 15 observations. During a single visit to a dining room, an auditor may be sent to 6 different locations in the dining room, instructing them to use one of their assigned sessions/cycles for each location. Once in the NE corner, for example, the auditor may need to evaluate a minimum of 3 dining tables (Tool-Driven), but the auditor would also have the option to "add and evaluate" as many as 12 additional dining tables (from the same area) if they wished (Auditor-Driven). The auditor can do this because 15 was the specified "max" for observations for the given session/cycle. The auditor would need to, as a minimum, go to 6 different areas (sessions/cycles) of the dining room, executing a minimum of 3 observations (tables) in each area. The auditor could, however, choose to evaluate as many as 10 areas (sessions/cycles) of the dining room, scoring as many as 15 tables (observations) in each area. The identical (specifically specified for the given situation) question/checklist, good/bad screen (or other data capture method) would be used/presented to the auditor for repeated use. An "add more observations" function is independent for each executed session/cycle (e.g., the auditor may choose to add 2 tables beyond the assigned minimum for the first session/cycle, and add 0, or 6 beyond the assigned minimum for the next session/cycle). Auditor-driven portion of data (sessions/cycles or observations added above the assigned minimum) collected via this option is typically treated having a "full impact" on a score, (by client choice) during the scoring process. As such, a score for a parent may be generated or updated according to one or more scores of child elements (e.g. composite scoring). In some embodiments, the parent element is not directly scored, and only receives a score from a respective child element. In other embodiments (score-to-categories) "buckets" (categories) may be assigned to questions, checklists or attributes. Scores received for the respective question, checklist or attribute may then be automatically sent to the respective category or bucket which appropriately affects the score of the given category. Such a score-to-category function may allow the system or a user to label every question or checklist (or any audit element) with one or more customized terms such as cleanliness, ambiance, variety, or friendliness, the terms associated with a specific category.

In some embodiments, several of the same locations, venues, destinations, or functions may be assigned to every auditor in a group of auditors, while still applying the herein described randomization to affect the selection of questions, checklists or audit elements that each auditor is assigned for those locations. As such, several people may be evaluating the same locations each with their own randomly selected material, except for "ask every time" content which everyone will receive. The results for each auditor may be combined to form an even more objective composite audit for a given location, venue, destination, or function. For example, eight independent auditors could be assigned content for a particular location, "Chemical Verification Room", at Plant #4 of a particular chemical company.

In some embodiments, attributes may be added by creator users or auditors. For example, attributes may be qualities or descriptions of audit elements. For example, an attribute for a kitchen sink audit element may be "clean and shiny". As another example, an attribute of a specific employee-guest interaction audit element may be "unscripted" or "genuine". An audit creator or an auditor may define custom attributes for audit elements via an appropriate user input.

The compiling step 208 of FIG. 2 may include organizing and filing the captured data. For example, the captured data 118 may be compiled into a more analyzable file. For example, a results file may be generated upon compiling the captured data.

The above steps provide an effective auditing system that can break down complex and detailed environments into multiple levels of detail or specifics. For example, as described herein, randomization parameters may be appropriately configured and selected to evaluate only a few audit elements such as CCPs to determine, calculate, or quantify the condition or quality of a parent audit element (e.g. a "parent" of a group of selected CCPs.) As such, the parent-child relationships provide an ability to create high levels of detail in for a created or developed audit.

The herein described randomization or randomization parameters may reduce the size or volume of the audit content to a manageable or appropriate size. For example, the randomization may effectively attain statistically valid results without requiring the system to ask every question, or present every audit element every time.

In some embodiments, various functions may be defined or included in situations where an auditor is running out of time (i.e. Running-Out-of-Time functions). More particularly, in a first example, an auditor may be reminded that time is running out, and the auditor may submit an audit prematurely (e.g. incomplete). After such an event, an auditor may be prompted to comment on any assigned audits or audit elements (e.g. assigned material). As such, any incomplete material (e.g. audit elements, audits) may be labeled, tagged, or scored "not inspected" carrying a null score impact as described herein. As a second example, the system may be requested to analyze any remaining content (e.g. audit content) and reduce the volume of the content based on a series of parameters. Such parameters (or rules) may be defined by a creator user or a client such as a cruise line. For example, such a rule may be "pick/retain only the questions/checklists that were weighted as 8 and above". Further, in the second example, using knowledge of a shortest route to an audit element, the system may identify and retain a pre-defined number of locations, venues, or destinations that are near to one another. Any remaining content (outside of those defined by the shortest route knowledge) may be scored null. As a third example, a time-of-day deadline may be defined for audit completion (e.g. a boarding time, restaurant opening time). As the deadline approaches (e.g. 30 minutes prior to deadline), the system may automatically prioritize the remaining audit content based on the various described weights, the various score types, and/or auditor location. When the deadline arrives, the system may automatically close an audit, scoring all remaining unanswered content as "not inspected", which may receive a null score.

In some embodiments, auditors may request or ask for more questions or checklists (e.g. audit elements) for a location, venue, destination, or function that they have been assigned. In such a circumstance, upon receiving the request, singular and specific questions or checklists designed for a given location, venue, destination, or function may be sent and provided to the auditor, the specific audit elements not being templated or repeatedly issued items. For example, such special (one-of-a-kind) checklists may be pulled and presented to an auditor for a specific circumstance only by auditor request (e.g. by tapping a Give Me More! Button). Tapping on such a button may present a randomized selection of a specified number of all remaining or unselected questions or checklists for a particular location or venue, or present 100% of all remaining audit elements for the given location/venue.

In some embodiments, items identified as being sub-par or deficient during a previous or prior audit may be considered in selecting audit content to be generated and presented to a user. Some audit items are, despite receiving a poor score, are not priority for re-inspection whereas on the other hand, some items may be a priority for re-inspection in a subsequent (future) audit. For example, some items may not be a priority for re-inspection due to a low assigned question or checklist weight. Past or historical audit elements may be re-selected for a new audit while taking into account the various scoring weights, attributes, tags, flags, or various metadata relating to an audit element for re-selecting the audit element. For example, a client may desire to have audit elements of certain weights appear again in an audit or be re-selected. For example, audit elements containing an assigned weight of a certain value or range of values may be re-selected to appear again in one or more subsequent audits. A number of audits to present the re-selected content may be defined by the creator or developer, or any user who "pulls" an audit from the database. For example, a creator user may explicitly define that two (or a certain number of) audits are to include re-selected content. Additionally, a creator user may define a threshold according to the actual performance evaluated during subsequent audits. For example, once an audit reaches 75% for a re-selected audit element, the certain audit element may be excluded from being re-selected. The threshold may be combined with a certain number of audits requiring completing to reach the threshold, or to reproduce the threshold (e.g. at least three quality thresholds must be reached to exclude the audit element from re-selection). As such, reselection may occur according to a performance achieved during a given audit. For example, poorly performing audit elements with a particular weight may reach a designated threshold (e.g. 75% performance achievement) to automatically or manually determine if the audit element is to be re-selected for a subsequent audit. The inclusion of a past audit element may be determined by a question or checklist weight that is defined by a creator user. Once an audit element is determined to be an item that needs to be re-selected, then the number of subsequent audits to include such re-selected audit elements may be defined or determined. In a first example, a number may be assigned, the number defining a number of previous audit elements to be included in a subsequent audit. In a second example, a threshold of an actual performance achieved during the subsequent audit causes re-selection of respective audit elements to halt or stop. The performance threshold may include a specified number of audits that must maintain a required performance level, a number of instances (e.g. audit elements must score a minimum of 75% or better, three times in a row). Once the threshold criteria is met, the audit element, question, or checklist reverts back to the database and becomes subject to standard or typical rules or selection criteria.

In some embodiments multiple independent auditors may operate simultaneously in complete isolation of one another. When all audits are completed, the various composite scoring methods described herein (e.g. score categories and parent/child relationships of scoring), may be employed to combine all audits into comprehensive results (e.g. as described with respect to the compiling step). Further, in some embodiments, a single audit may be split between multiple auditors, each of whom will conduct their own portion of the audit independently but simultaneously with others. The splitting and assigning may be dependent on how many auditors are specified (e.g. user-selected from a listing of an active device recognized by the system), and any assigned locations, venues, or destinations for audit observations. Such assignments may be manually selected by an assigner (e.g. creator user) or selected automatically via the system via the shortest route methods/approaches described herein. As an audit team works through and completes assigned material (audit), completed content is synchronized and compiled (live, over Wi-Fi, or via a cell network), and a percentage complete figure may be generated procedurally, and a cumulative/running score ending in one composite audit may be generated.

Additionally, an "on-the-fly" composite audit may be generated and included. For example, a single complete audit may be created and commenced by an auditor. At some point, the auditor may choose to "split" remaining content "on-the-fly" if the auditor is running out of time. In such a situation, the auditor or creator may manually select, direct, or assign specific material to specific team members. Further the herein described magnet functionality may be incorporated to execute a system-driven split/distribution.

The result presenting step 210 may include displaying the compiled or captured data to a user (e.g. the creator user or an evaluator user) e.g. via the results analyzer 110 of FIG. 1. For example, FIG. 4 shows a graph 410 displaying various scores (e.g. according to score categories "compliance" "performance" and "condition") of various audit elements. For example, each audit element may be presented with an associated score for each respective score category. Further, a "target" score may be displayed showing a target score that a business may desire to achieve. For example, an audit creator may be provided target scores for various audit elements or audits. As such, an audit creator may design a "canned" audit for a particular businesses' needs and desires. In addition to score categories, any appropriate category may be displayed for any respective audit. This function provides an accurate, useful and dynamic analysis method not present in the prior art.

In some embodiments, a learning function may be implemented. The learning function may cause an audit, the database, or the system to evolve. For example, the various custom additions (adding zones, elements, attributes, tags, etc.) may cause the database to change and adapt according to one or more auditor contributions. Auditors can update their content by simply adding or deleting sub-zones within zones, or audit elements within sub-zones. This can be done (as needed) while they are conducting their routine audits. The "adding" option is available if their given audit contains 100% of the available audit content for the relevant area. The rationale being, if the auditor is working with randomly selected audit content, it is very possible that the "missing sub-zone" or "missing audit element" (that they wish to add) is not really "missing" (from the content database), but rather, was simply not selected for inclusion in the given audit. For example, when operating in the 100% content environment, if, while inspecting the Housekeeping Ice Station, the auditor encounters an audit element that physically exists in the Ice Station, but is not represented in the audit content, they can add an independent audit element to add it (and its associated questions/checklists, relevant details) to the given sub-zone. Outdated items may be deleted by a user such as a business or client or creator (and in some instances, an auditor). As such, they can delete sub-zones and audit elements as needed. If a sub-zone or an audit element appears in an audit, and is determined to be "out of date" (e.g., missing; clearly no longer in use), it may be deleted from the content database. Adding and deleting may be allowed according to certain conditions. For example, one condition may be that an audit element must be requested for "addition" or "deletion" three (customizable) independent times (three separate audits) before the system will "learn" (accepting the request and actually adding or deleting the item, Sub-Zone, or Audit element). A second condition may include a minimum of two (customizable) different auditors (different sign-in credentials) requesting the same "addition" or "deletion" before the system will "learn" (accepting the request and changing the database accordingly.). Following the request, the sub-zones and/or audit elements proposed for addition or deletion are displayed on the device screen in different colored text (red for deletion, green for addition), prompting subsequent auditors to either "confirm" or "deny" the appropriateness of the request. It is also possible to have the system "learn" (only in regards to "deletions") through a passive approach. Each time a given an audit element (or any attribute assigned to that given audit element) is scored with something other than N/A or Not Inspected (N/I), it is in essence verifying that the audit element still exists, and that the information in the audit content database is current, or correct. Additionally, the converse is also true: every time an audit element is scored as N/A (but not N/I) the system can interpret this as a "passive" request to have the Audit element deleted. With this approach, the presence of every audit element is "verified" during every audit. If an auditor scores any audit element with N/A, it should be an indication that the audit element is no longer present But, to be safe the system can require that this same Audit element be scored as N/A two or three additional times (as desired by a creator) to ensure it is not a mistake, before allowing the system to delete the audit element from the database. These "passive methods for deletions" can be applied to other levels in a parent child relationship (e.g., zone, sub-zone, sub-sub-zone); and are not limited to any level in a parent child relationship.

Figure 17:
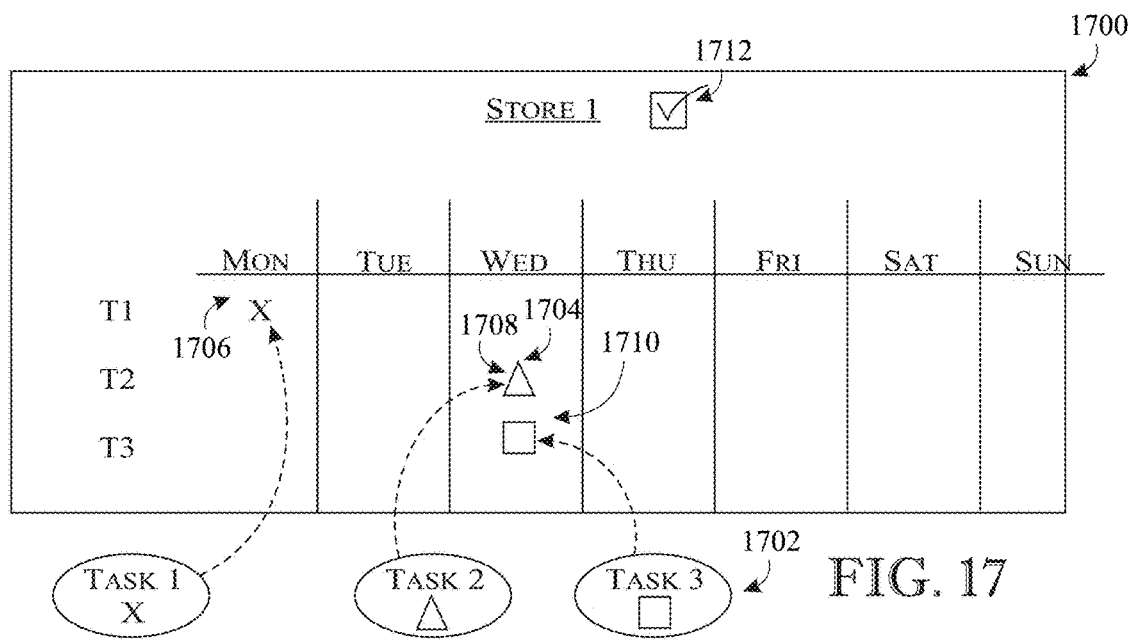
FIGS. 17-19 present various user interfaces of a scheduling system, in accordance with aspects of the present disclosure.

The illustration of FIG. 17 shows a scheduling interface 1700 of a scheduling system as a scheduling table that is configured to receive a user input to schedule various tasks 1702. For example, a user may be a manager of a coffee shop, and the user may drag and drop tasks 1702 to time slots 1704. For example, FIG. 17 shows task 1 being scheduled to timeslot 1706, which is at time T1 on Monday. Task 2 is being scheduled to time slot 1708 which is at time T2 on Wednesday. Task 3 is being scheduled to timeslot 1710 at time T3 on Wednesday. Therefore, the disclosed system receives a user input such as a mouse click, or a drag-and-drop operation to position or assign a task to a specific timeslot in the scheduling table.

It is to be understood that icons may be displayed that represent tasks. For example, a task may be a cleaning task and an icon resembling a cleaning operation may be displayed to represent a cleaning task. As another example, a maintenance task may be displayed along with a maintenance resembling icon. Therefore, FIG. 17 shows various arbitrary visual indicators (X, Triangle, Square) to represent visual representations of tasks. It is to be understood that the system may be configured to assign tasks to timeslots in any appropriate way, such as via a drop down list having selectable options.

The scheduling interface of FIG. 17 allows a user to commit to tasks such that upper management does not need to micro-manage tasks. For example, upper management of a large coffee shop chain may require that a certain number of tasks be completed in a certain week. However, not all locations in the chain may be able to follow a universal task schedule. Therefore, the tasks 1702 may be scheduled to timeslots in a customized fashion such that the tasks are completed at a most effective and efficient time slot for each location as known best by a local manager.

Figure 18:
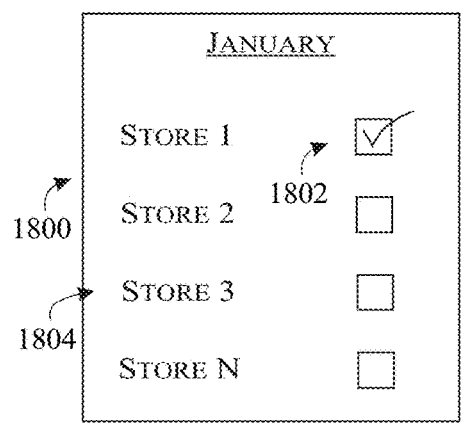

Tasks may be verified as being completed upon the system receiving a user input. For example, a manager may indicate via a user input that a task is complete. When a set of predetermined tasks are completed, the system may deem a store up-to-date with their tasks. For example, checkbox 1712 may be automatically ticked when tasks 1, 2 and 3 are verified (either automatically or manually) as being complete. Such task completion may be relayed to upper management, for example, via interface 1800 shown in FIG. 18, where checkmark 1802 is displayed among a plurality of stores 1804 that are requiring task completion verification for January. It is to be understood that the scheduling interface and system may be implemented for any appropriate venue, store, or location such as restaurants, bars, cruise ships, concerts, cinemas, etc.

Figure 19:
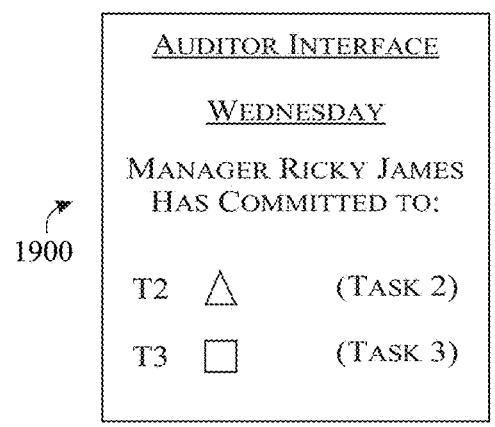

Further, the system may relay task information to auditors to help an auditor focus on tasks that have been committed to and/or completed. For example, FIG. 19 shows an auditor interface 1900 being displayed that indicates that a manager has committed to task 2 at time T2, and task 3 at time T3, on Wednesday. Therefore, an auditor may walk into a location or venue that is to be audited, and the auditor may be presented with tasks or audit elements that require auditing based on the committed tasks shown in FIG. 17.

Figure 20:
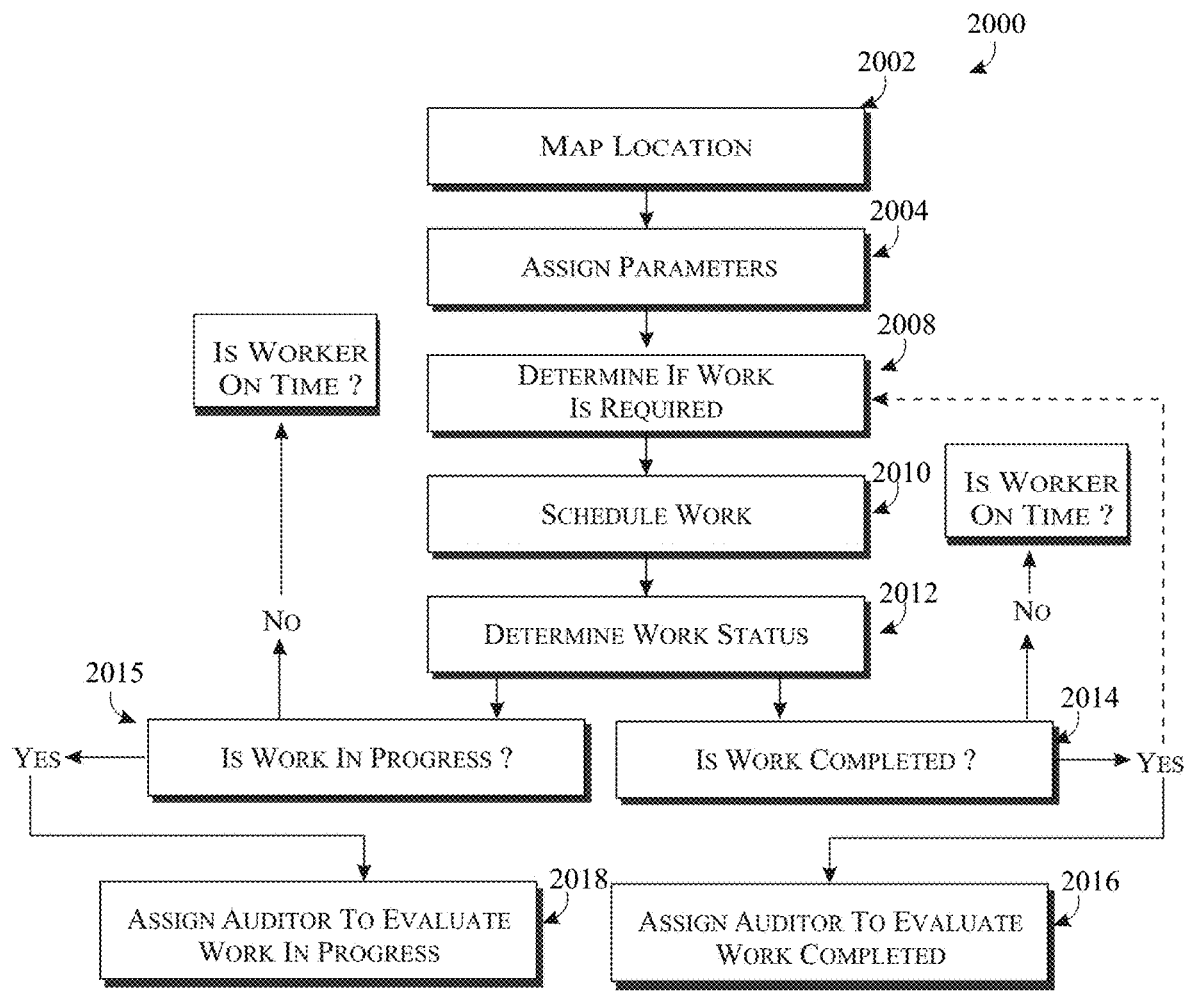
FIG. 20 presents an exemplary method of scheduling work, in accordance with aspects of the present disclosure.

The illustration of FIG. 20 presents a method 2000 of scheduling tasks, determining a status of a task, and assigning an auditor appropriately.

At 2002 a location is mapped according to zones and sub-zones as described above. For example, as shown in FIG. 10, the Lounge/Library may be a parent zone of subzone 1004. Subzone 1004 may have its own subzone 1006 and it is to be understood that any number of subzones may be mapped. It is to be understood that a child sub-zone may be attributed to any of the herein disclosed features as attributed to a parent zone or sub-zone.

At 2004 parameters are assigned to one or more of the mapped zones of step 2002, or to any appropriate feature or attribute of an audit element. The parameters may be used in step 2008 as described below with respect to calculating a scheduling value.

Turning back to step 2004, the scheduling parameters include: a risk value, a body volume, a location status (e.g. status of a ship being at sea or in port), a code level of a ship or facility, and/or a status of a zone or subzone.

A risk value may represent a risk of transmitting contagious diseases or a hygiene risk (e.g. Norovirus) for a particular zone or audit element (e.g. arm of a chair). A risk value may be assigned by an audit creator or an administrator of the system according to various parameters described herein. A risk value may be assigned at any appropriate level, such as zone, sub-zone, sub-sub-zone, feature level, or attribute level (e.g. cleanliness).

In one example, determining a scheduling value for a zone may include measuring an amount of human traffic in that zone. As another example, determining a scheduling value may include considering a status of a location or venue, such as the status of a cruise ship (e.g. docked). Further, the scheduling value may be determined by taking into account a time of day.

Another scheduling parameter may be a body volume. The body volume may be dynamic such that it is tied to an external information source. The body volume parameter may reflect a number of bodies across a gangway (e.g. as seen through a security system). Further, a point of sale (POS) volume and/or RFID or other tracking system may indicate body movement or presence in various areas to determine a body volume parameter value. Such a body volume parameter may be designated at database set up, but it may be configurable as needed by a user. For example, the body volume parameter may be designated by hour at zone or sub zone levels. Further, a given zone may be a public stairwell, open 24 hours per day and peak periods of activity (body volume) may be specified. Body volume values may vary throughout the day and night (as specified), and may be a parameter in the below described scheduling value calculation.

Another scheduling parameter may be relating to a status of a ship, location, or venue. For example, a ship being "in port" or "at sea" may be a definition for a ship status, and the status of the ship may be tracked using actual times of day. Further, a ship or facility code level may be considered a scheduling parameter. For example, a ship code level may relate to a sanitizing program, and may be green, yellow, red, and/or black.

Another scheduling parameter may be the status of a zone or sub-zone, which may be open, closed, locked and/or unlocked.

It is to be understood that the above described scheduling parameters may take any appropriate value, and may be selected or determined manually, or calculated automatically. Further, it is to be understood that any of the herein described parameters may be used to determine which tasks are to be assigned to particular workers.

At 2006 a work type is assigned. For example, a work type may be assigned according to a worker type such as maintenance, cleaning etc. As shown in FIG. 21, sub elements of a chair are assigned to a cleaning crew work type and a maintenance crew work type. The cleaning crew is assigned to clean the seat, arms, and legs, and the maintenance crew is assigned to evaluate damage to the legs particularly. Therefore, one attribute or feature may be assigned to multiple different worker types, such that that one attribute is handled by different types of workers having different responsibilities. For example, in the example of FIG. 21, the legs will not only be cleaned by the cleaning crew, but the maintenance crew will also be assigned to ensure screws attaching the seat to the legs are present and secure. It is to be understood that one or more zones may be attributed to a specific work type.

At 2008 the method includes determining if work is required. For example, determining if work is required may include calculating or generating a scheduling value from the above described scheduling parameters. Each zone, location, attribute, or feature may be associated with its own scheduling value, and the scheduling value may be calculated in real-time. Upon the calculated scheduling value reaching a specific threshold, the system may be configured to schedule work to a respective audit element (e.g. zone) for a specific worker or worker type. For example, a maximum scheduling value may be designated, such that when the scheduling value reaches the maximum value (or in some cases, minimum) work may be automatically scheduled to a respective area holding or attributed to that scheduling value. The above described scheduling value may be dynamic and may change throughout a day according to the above described parameters. Therefore, the system may be configured to register or determine that work is required upon a threshold scheduling value being reached.

At 2010 work is scheduled. For example, work may be scheduled according to the above described scheduling value calculation and work type upon determining work being required in a specific zone or for a specific audit element (e.g. chair, or arm of a chair). For example, work may be scheduled and an employee may be notified via a personal electronic device that they have been assigned work at a particular zone and at a particular time. As shown in FIG. 10, worker B is scheduled to subzone 1004 at 10:04 AM. In other examples, work may be scheduled according to a timetable that was pre-determined.

At step 2012, the status of a task or work assignment is received, determined, and/or registered in the system. The status of a task may be indicated, determined, or registered manually or automatically. To register a status of a task, a worker or employee may be provided with an electronic device that is communicatively coupled to the system such that the device may be operated by the worker to indicate a task being completed or a status of a task (e.g. started, stopped, in progress). The system may receive the status and process the status as described herein. For example, the status may be registered in the system as "started", "completed" or "stopped", or "in progress" and this information may be relayed to an auditor. Therefore, the electronic device may include buttons such as "start", "stop" and/or "complete". Further, the employee device may be configured to wirelessly communicate a location (e.g. via GPS) of the employee such that the employee may be automatically verified as working in a zone of an assigned task. Therefore, a user input (e.g start, stop, complete) on such an employee device may be referenced to an automatically detected zone or location of the device. In some examples, audit content may be selected for being sent to an auditor according to if a start or stop button is pressed on a worker device. For example, if the start button is pressed, the system may select a current task assigned to the worker for being included in an audit (e.g. randomly included in an audit, from a pool of audit content). Such content, when included in an audit may be drawn from possible audit items listed as eligible for selection while the task is deemed "in progress", and likewise this feature or process may apply to the configuration of the start or stop button.

At step 2014, if a task is not registered or indicated as being completed, the method determines if an assigned worker is on time with an assigned task. If a task is registered or indicated as being completed, the method proceeds to step 2016 where an auditor is assigned to audit or evaluate the completed task and verify its completion (i.e. completion status). In some embodiments, the method may additionally or alternatively return to step 2008 where the system determines if work is required. At, or after step 2016, the system may present specific audit content to an auditor according to work having been completed, such as asking the auditor to evaluate the final state of the task (e.g. whether a light bulb has been changed).

At step 2015, if a task is not registered or indicated as being in progress, the method determines if an assigned worker is on time with an assigned task. If a task is registered or indicated as being in progress, the method proceeds to step 2018 where an auditor is assigned to audit or evaluate a task in progress. For example, an auditor may evaluate a worker while the worker is currently working on a task assignment, and the system may present specific audit content according to the work being in progress (e.g. evaluate the worker's attire, evaluate the safety of the worker).

Therefore, disclosed is a custom work or task scheduling and automatic-selection-for-audit approach using the above described database of content, organized by zones or subzones. The automatic selecting of audit content may be done in real time, according to various parameters, such as a status of a task assignment, a predetermined or fixed scheduling requirement, a work type, and/or a calculated scheduling value having various scheduling parameters.

In a first step, work or tasks may be scheduled based on client-specified input regarding required frequency, durations, time-of-day (TOD) preferences, and any other appropriate descriptors. For example, stores and/or facilities may be provided with a template for their custom scheduling of company-required work/tasks (which could be a template for scheduling on a daily, weekly, and/or monthly basis, as non-limiting examples.

A list of "requirements" (work/tasks) represented as "boxes" (or other form) may be "dragged and dropped" and/or transferred from a column of "to do" to columns of "holes" (e.g. time slots) or days/times where work/tasks could be scheduled. If a work/task is required to be performed three times per week, then three individual "boxes" for that work/task would be created by the system and would be presented to the facility (e.g. user) for the scheduling step. Work/tasks that are expected to be performed "daily" (or other fixed aspects) are auto-populated into each facility's individual schedule prior to them receiving it for their custom assignment step.

In a second step the customized "work/task" assignments created in step 1 may be sent as "push" notifications appropriately as assignments. Assignments may be listed in a "truncated" fashion, with the assumption that assigned workers "know what they are doing". For example, a push notification may display "CLEAN—Men's Restroom".

The above described guidance button (S-Guidance) may be provided to and displayed for less knowledgeable workers, where tapping the guidance button reveals listing of features, attributes, and/or special instructions.

An actual assigned time of day for some work/tasks may be calculated by the system based on a number of factors. For example, the system may be configured to assign a task that must be performed every 2.5 hours a day once a respective facility, store, or location is open for business.

In a third step, workers (e.g. facility workers) may conduct work/tasks, and "mark off" or "check off" (i.e. as a task status verification step) work assignments as completed. Each work/task may have a "Start" and "Stop" button which may be tapped or activated appropriately. In some embodiments, a "Done" button may be displayed or provided to a user (e.g. employee or worker). Duration data, which may be time elapsed between Start and Stop button activations, may be extracted for management use. The tapping of either the "Stop" or "Done" buttons may indicate or represent "verification" that the work/task has been completed. In some embodiments, an electronic signature of a worker may be captured (e.g., actual signature, typed in employee number, bio-read). This "signature" may be specified to be required prior to the verification (Stop/Done) on a task-by-task basis, or at the end of a series of completed tasks.

In some examples, work/tasks cannot be "signed off" or verified if the attempt verify the completion of a task violates a time-of-day (or other) "rule". For example the system may be configured to disallow the verification of 3 public restroom cleanings, one right after the other, or within minutes of one another.

Further disclosed is a system and method for automatic selection for auditing. For example, when "verification" of completed work/tasks occurs, this specific material (e.g. task) may become part of "automatically selected for audit" content, or part of (automatic "ask every time") content for any audit that is conducted within a variable number of days. For example, a facility (e.g. manager user) may have committed to cleaning drain #2 on Tuesday, and that task may be added to content that is to be audited (e.g. audit content) or added to a list of things to be inspected, such that the added tasks may be pulled (e.g. complied or presented to an auditor) for conducting an audit on Thursday.

The "number of days out" for content to be automatically selected for audit is adjustable by task type (e.g., auto-audit floor drains for up to 5 days following the worker's verification that the work was completed or auto-audit Women's Restroom ADA handrail cleanliness for up to 2 days following verification). When sufficient time passes following work/tasks being verified as completed, they fall beyond the designated "automatically select for audit" period. When this occurs, these items revert to the "pot of items" subject to normal randomization rules applied for the given audit.

One benefit of this system is that the system allows facilities/stores to "schedule" their highly detailed work/task assignments themselves to optimal timeslots. Another benefit is that the system provides documented "verification" when the work was completed. Further, the system triggers an auto-select-for-audit function as described above, focusing the auditor on the specific work/tasks the facility/store claims to have just/recently completed.

The knowledge that the dates for audits are randomly selected, paired with a guarantee that the most-recently completed work/tasks will be audited, provides pressure on the individual facilities/stores to do the work as scheduled and to honestly report work/tasks that have been completed. Further, the system allows a client (e.g. facility) to specify, at a more detailed level, the required work/task assignments, including required frequencies, for facilities/stores of greatly varying sizes/volumes of business. For example, a 100 square foot coffee store located in the middle of nowhere vs. a 2,500 square foot store located in Manhattan may have different optimal times for specific tasks to be completed. This approach greatly improves accountability and it allows the individual facilities/stores to schedule the required work/tasks when they know it can be accomplished, rather than a blanket expectation that potentially collides with local conditions and required frequencies for tasks, driven by a volume or size of a store. Therefore a store may be able to assign their own dates/times due to potential collision with local conditions (e.g., Wednesday is "market night" and they are slammed with customers). Further, the upper management (e.g. company) may assign a store different required frequencies (e.g. number of times to complete a same task such as mopping the floor) given the stores' size/volume.

Further disclosed is a system and method for dynamic scheduling of work and auditors. For example, the system may identify and schedule required work.

A "worker" is defined herein as a person who is assigned to actually execute work (e.g. cleaning, repairs, and sanitizing). An auditor is a person that is assigned to specific things, workers, supervisors, locations, or areas to audit target elements.

The system may include a single database that can be used for many different work/auditing assignments. A cruise ship, store, facilities (e.g. venue or location) may be "mapped" using the above described zone system, and then various parameters may be assigned to various "levels" within the zone system's "children" (e.g., sub-zones or features such as an arm of a chair).

In one example, a risk value (none, very low, low, med, high, very high) could be assigned to the various levels in a zone where an associated numerical factor would be assigned to each level of risk. This factor becomes part of a calculation to determine when work should be performed. Using this as an approach, an audit designer can create a single database for a given client, and pull relevant content, as needed, given the type of work to be assigned and audited, in accordance with risk values described above.

For example, a single content database could be developed for a cruise ship company (containing all the company expectations), and zone-system mapping could be executed for each of their individual ships. Using this information, along with the additional designations (e.g., one line of content in an audit can be used for cleaning assignments; one line of content can be used for sanitizing assignments, one line of content applies only to maintenance duties) different "work assignments," (and the subsequent auditing thereof), can be "pulled" from the single database.

Need for a task or work assignment may be determined by the system as follows.

In one example, a need for a work assignment may be determined in accordance with a previously scheduled routine (e.g., "Every day between 1:00 pm-2:00 pm", or "every Friday after closing"). In another example, a scheduled routine may require work to be done in a fixed manner such as daily, every 4 days, weekly, or monthly.

A need for a work assignment may be calculated. For example the above described scheduling value calculation may use the following parameters (and others) to determine when work (a visit by a Worker) is required: body volume, dynamic—tied to external source of info, bodies across the gangway (through security system), "Point of sale" (POS) volume, RFID (or other "tracking system") indicating body movement/presence in various areas, and/or pre-designated in database set up. The parameters to determine a need for a work assignment, or for determining a scheduling value may be configured and customized by a user. It is to be understood that the above described scheduling value is an output generated using the above described scheduling parameters, and when the scheduling value reaches a threshold, work is assigned and scheduled as described herein.

A need for a work assignment may be determined according to a current time at a zone or at sub-zone levels. For example, a given zone could be a public stairwell, open 24 hours per day. However, peak periods of activity (body volume) can be specified per hour. The varying levels of body volume, throughout the day and night (as specified) would "drive" a calculated requirement for work/tasks to be performed (e.g., increased likelihood of trash, fingerprints on chrome handrails) during higher volumes of activity, and the system may schedule more frequent worker visits during these designated periods.

The system may be configured to determine who should do work or a task. For example, a worker may be assigned using pre-determined specifications in the database. Workers can be assigned from various pools of workers (e.g., Bar Staff, Casino Staff, General Cleaners, Retail Staff).

Various types of workers may be assigned work by the system. For example, types of workers may include a dedicated work force and a non-dedicated work force. As non-limiting examples, a dedicated work force may execute assigned work as a full-time job and may carry electronic devices for receiving instructions and tasks. In some examples a dedicated work force may not carry electronic devices for receiving instructions and tasks. A non-dedicated work force may include workers that have primary jobs or duties beyond the expected execution of the assigned work. Workers in a non-dedicated work force may or may not hold electronic devices configured to receive instructions or tasks.

How an area or zone typically operates may be attributed to a zone. For example, a typical operation of one zone may be different than a typical operation in another zone and work and auditing may be assigned accordingly. For example, a given zone could be a retail shop that has specific hours of operation. When closed the shop (venue) is locked (assumed no activity inside). When open, the shop workers could be assigned to perform work/tasks. When closed (locked), no one needs to be assigned to perform work.

Another zone could be a bar, in which the seating area is open to the public 24-hours per day, but the "back of house" areas may be only open (to the workers) when the bar is open. Worker types (which group they belong to) can be assigned for different areas (sub-zones) in the zone, and can also vary throughout the day/night as the open/closed status of the bar changes. For example, during the day, when the bar is closed, the public area seating can be assigned to a general cleaner. Once the bar opens, these same areas could be designated to be cleaned/serviced by the bar staff. These public areas, along with the "back of house" areas (that may be in use, due to the open status) would receive differing levels of attention (scheduled work) throughout the day and night, depending on the designated estimated body volume for each of the sub-zones, whether or not the bar was open or closed, the risk value assigned, and other factors associated with the specific zone/sub-zone, features, etc.

Furthermore, the system may determine a type of work or worker that is required for each assignment (e.g. drawn from pre-determined assignments/designations in the database). For example, the type of work or worker may be specified at a sub-zone level. Worker types (i.e. which "pool" they belong to may be bar staff, general cleaner/workers, casino staff, or retail store staff. For cleaning assignments, dedicated cleaners, venue staff (casino workers to perform work in casino areas), and/or galley cleaners may be assigned. For sanitizing assignments dedicated sanitizers, dedicated cleaners, and venue staff may be assigned work. For maintenance assignments, electricians, plumbers, carpenters, and/or a maintenance supervisor may be assigned work. For soup cooking assignments, a soup cook may be assigned work.

A specific sub zone (e.g. sub-zone 267.8) could have the following designations which allow for assigning the right worker for the right job, and during the right time of day. For sanitizing work, when the zone is "open", venue staff could be assigned work, and when the zone is "closed", a dedicated sanitizer could be assigned work. For electrical maintenance work, when the zone is "open" an electrician could be assigned work, and when the zone is "closed" (e.g. no access), electrical work may not be scheduled.

Using this approach the system can schedule different workers for different areas within the same venue/zone, every hour of the day, schedule the right type of worker, and at the right time of day, for the right assignment (work type).

Using these designations the system can also assign the correct (knowledgeable) auditor to audit: the worker (conduct an interview, ask for demonstration of knowledge) while the worker is performing their duties (trigger for auditor: start button pushed by worker), or inspect work once completed (worker has indicated, verified, "work is done" (trigger for auditor: stop (or done) button pushed by worker). Such a trigger may not actually trigger an assignment for an Auditor (to go to an audit), but rather, it may enter an item into a pot of potential Audit items (e.g. audit elements) from which actual audit items are randomly selected and assigned by the system. It is to be understood that the above described shortest route considerations may be included in such random selection process.

The work may be scheduled by the system dynamically. For example, the system may be configured to determine which work assignments are required for a next number of hours. Further, the system may determine if any scheduled routines are due as described above. A calculated demand for work may be determined as being due. For example, using the above described scheduling value calculation, a requirement for work may be detected or determined as described above. Further, the work may be scheduled dynamically by determining a worker type and calculating or determining a shortest route sequence to assign work to all required work areas. For example, a sequence of zones may be assigned to one or more workers for sanitizing assignments by determining a shortest route between the zones such that the worker does not waste time looking for work or traveling to zones that are unnecessarily far away.

The system may determine where required work assignments need to take place. For example, the system may determine where "like worker" work assignments are located (within the ship/facility). For electrical work, zones and sub-zones where required work is located may be identified by using closest shortest route node numbers. For sanitizing work, attributes, features, sub-zones, and zones may be determined as needing work according to a shortest route node for a specific zone. And for cleaning work, sub zones and zones where required work is located may be used to determine a shortest route node for a specific zone.

The system may determine when work assignments need to take place. For example, the system may be configured to determine a specific time of day a task is required to be assigned and completed. If the system determines a specific time of day for an assignment, the assignment may be scheduled (fixed, e.g. Fridays at 4:00 PM), or calculated (dynamic, e.g. immediately after closing or ever hour after closing). Further, a specific time window (e.g. 10:05 am to 12:34 pm) may be scheduled for assignments (e.g. every day between 3:15 pm and 4:15 pm). Further, a calculated or dynamic assignment may be scheduled for a time window, such as by using the above described scheduling value calculation (e.g. sub-zone 34.6 needs to be sanitized no later than 3:46 pm, but no earlier than 2:46 pm). For example, a latter point in time may be derived from a configurable value (e.g. 1 hour) that is applied to or subtracted from an actual time of day that the scheduling value calculation determines to a be a critical moment. In a similar way, it is possible to have a configurable value that is added to a critical moment in time that the scheduling value calculation (or calculator) has determined. For example, the added time may be considered a grace period. If the system does not determine that a specific time of day that a task is required to be assigned and completed, work assignments can be scheduled through shortest route nodes (e.g. shortest route zones) instead of being scheduled according to a time table.

Worker routes may be scheduled according to a number of workers and a type of workers needed to meet an anticipated work demand based on a series of assigned factors such as actual time of day or shortest route nodes. Further, worker routes may be scheduled according to critical time of day requirements associated with given work assignments (e.g. according to risk values, or calculated scheduling values).

The system may determine if workers are going to make it on time for any or all work assignments, such as critical work assignments, and this may be considered when building an original worker route or determining which worker may be assigned to certain tasks. Therefore, for each assignment, transit time may be considered, where transit time is calculated by estimating a transit time between each designated locations (nodes) given a shortest route sequence. Further, the system may calculate an estimated transit time between nodes based on adjustable speed or velocity (e.g. meters per second) factor. Actual vs. forecasted transit times may be monitored, and significant statistical deviations may be reported to management for consideration. Further, time that it takes to complete work may be detected and compared to pre-determined designations in the database. Estimated or pre-determined transit time and time to complete a work assignment may be added to one another in determining if a worker can make it on time for a work assignment.

If the system is aware that there are estimated times for completing a work assignment or transit times, (e.g. allotted time (HH:MM:SS), the system may compare these times to actual transit times and work completion times. If the system is not aware that there are estimated times, the system may schedule a worker according to a shortest route between required locations and the worker may move from one assignment to the next as each assignment is completed, while verifying start and stop times.

If it is determined that a worker will run out of time before assigned work can be completed given a number of hours in their work shift, the system may add an additional worker (e.g. of the same type for typical conditions, but under special conditions such as different ship code levels a different worker type may be substituted).

For worker meal breaks, an adjustable duration may be inputted or scheduled into an initial schedule for a specific time of day. The system may pick a time for the meal break according to parameters or meal breaks may be manually scheduled.

If Work assignments are executed in a designated shortest route sequence (also considering transit time), the system may determine if it expected that the worker will be able to get to all the required areas on time to meet any critical designated times-of-day. For example, the system may calculate an entire "work assignments string" being time to execute the work plus transit time.

The system may determine where the workers are located, what task they are doing, and when they are supposed to be doing the task. For example, if work assignments contain specified times to complete work, these figures, along with the transit time calculations will determine where the worker will be, and what they should be doing, at and between specific times during the day (or night) (e.g, from 3:53:04 pm to 3:57:02 pm worker is at Zone 67, from 3:57.2 pm-3:58.7 pm—the worker is in transit between Zone 67 and Sub-Zone 245.4).

The system may include artificial intelligence also referred to herein as a smart program. For example, when the system identifies any available gaps in time between two critical work assignments the system may dynamically (either initially or as the situation arises in real time) assign, based on a series of parameters/priorities, additional work in between a first point and a second point. For example, in one scenario the worker needs to be at Point A at 12:15 pm, where work is designated to require 2 minutes (taking them to 12:17 pm), and then the worker needs to be at Point B at 12:25 pm, with a transit time of only 1 minute between locations, and if they went directly from A to B, they would arrive at B at 12:18 pm—thus leaving 7 minutes available for additional work in between Points A and B. Since the system is configured to determine how much time work assignments may take, and transit time, the system may automatically schedule tasks for that worker in that 7 minutes of available time.

Further, the system may conduct ongoing reevaluation as time of day advances of progress that individual workers are making against their initially-assigned schedules. For example, the system may be configured to determine where a worker is in relation to their assigned schedule. For example, the system may be configured to determine if a worker is ahead of schedule, behind schedule, if they are they in danger of missing a critical assignment. The system may constantly evaluate if a worker is on track to make it to an assignment, and if the system needs to reschedule work for the a currently-scheduled worker (e.g. moving the critical assignment earlier in their route even though by doing so, the worker may deviate from a true shortest route for all assigned locations). For example, the system may determine if work assignments are to be displaced to allow the movement of a critical assignment earlier in the schedule. For displaced work assignments that were originally automatically added in to fill a gap, these displaced work assignments may be dropped completely from a schedule if needed and no reschedule may be required. For displaced work assignments that are derived from a scheduled or calculated need, these displaced work assignments may be rescheduled to another worker. Work assignments may be rescheduled to workers of the same or different types, and the system may determine if rescheduling will not jeopardize on-time execution of any critical work assignments. Work may be rescheduled according to a determined proximity of another worker. For example, the system may reschedule work to a closest worker or a specific worker according to shortest route nodes or locations, or according to time requirements to execute a work assignment with respect to a new worker.

Worker breaks may be handled as follows by the system. When a worker takes a restroom break time may be allocated for an associated completion time of a task. For example, one 10-min break may be considered in a total time required in the worker's schedule, or considered in an estimated time to complete a task. When a break is "requested" the system evaluates if taking a break immediately would jeopardize any critical work assignments, and if it would jeopardize the assignment, a message may be presented to the worker or a user that the break will be delayed but granted later. If the break would not jeopardize the assignment, the break can be granted after completion of current assignment. If the worker is currently in transit, then the break may be immediately granted and an estimated transit time (duration) may be suspended and automatically resumed in 10-min.

It is to be understood that the herein disclosed schedules or routines may be communicated to a personal electronic device through a scheduled (fixed) list of expectations (e.g., every day between 1:00 pm and 2:00 pm") or dynamically through a pushed schedule or pushed notifications. Further, work may be communicated through physical hard copy (paper) postings (e.g., posted in the back room of a bar).

Assigned work may be verified by worker check-in/check-out (based on assignments). For example, if a worker carries an electronic device, an RFID tag of the worker may be detected at a location, venue, or other smart device that detects RFID tags. If a worker does not carry a device, a phone call to the system from an assigned location may be made by the worker such that key coded may be entered through the phone call to indicate a status of an assigned task. Touch screen tablet computers (or other appropriate devices) may be permanently located/maintained in a location/venue to act as a worker interface.

With regards to auditing, auditing may be done by a business owner or by a company. For example, the business owner may run ongoing auditing to manage and audit their own system's execution, and the company may produce periodically executed audits to audit the business owner's quality of system execution.

Remote auditing (e.g. armchair auditing) may be conducted via the disclosed system. For example, video surveillance through a feed or footage may be used to tie date and time stamps to workers' verified work (e.g. started, stopped, completed). For example a manager of a fast food restaurant may be pushed a condiment bar clean up assignment, they may provide a user input that the assignment is complete. Video surveillance may be checked to determine if the action actually took place. Using this as an approach, companies could install high resolution cameras for this specific purpose (e.g., companies could find out if sour cream was put in the right area of a taco.)

The system may select slices in time to audit. For example, the system may not only randomly select which "slices in time" to audit, but would also seek through the video footage, locating the correct date/time stamped period, add +/- footage before & after the designated time, pull the footage (or more likely, just tag the section) and present these selected clips to the armchair auditor for their audit/review. Using this approach, literally 1,000's of venues, stores, facilities could be audited remotely by a single individual, located anywhere in the world sitting in a chair.

The system may be configured to maintain a live confidence level regarding the current effectiveness of the program(s) based on a % of attendance by workers with assigned work tasks (e.g. whether the worker checked in/out as scheduled).

Ongoing audit results (e.g. via a business-owner's auditor) may evaluate worker knowledge. For example, worker knowledge may be evaluated through questions asked by an auditor, or during execution of work as secretly observed by an auditor. Further, worker designated/required supplies/equipment and completeness/readiness may be audited. Workers present/actively working in assigned locations/venues (e.g., sub-zones) during periods between "check-in" and "check-out" may be audited. Further, quality of work performed may be audited according to a level of effectiveness of a completed task. For example, a level of effectiveness of an actual sanitizing effort may be evaluated and audited as determined by a swab test and/or a reading device. For example, such a reading device may be used to determine an actual germ level remaining following a sanitizing effort of a worker. Further a level of cleanliness achieved (e.g. visual inspection) may be evaluated through a quick pass/sweep or deep cleaning. Furthermore, testing (e.g. electrical) may be conducted as appropriate to evaluate the functionality of electrical devices or components.

It is to be understood that the above described workers or employees are not limited to being humans, and in some embodiments robots or other programmable devices may be considered workers or employees as described above.

In some embodiments the methods, processes, operations, and/or tasks described above may be effected, executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. For example, a suitable computing system may be computing system 300 shown in FIG. 3. When such methods and processes are implemented, the state of the storage machine 304 may be changed to hold different data. For example, the storage machine 304 may include memory devices such as various hard disk drives, CD, or DVD devices. The logic machine 302 may execute machine-readable instructions via one or more physical information and/or logic processing devices. For example, the logic machine 302 may be configured to execute instructions to perform tasks for a computer program. The logic machine 302 may include one or more processors to execute the machine-readable instructions. The computing system 300 may include a display subsystem 306 to display a graphical user interface (GUI) or any visual element of the methods or processes described above. For example, the display subsystem 306, storage machine 304, and logic machine 302 may be integrated such that the above method may be executed while visual elements of the disclosed system and/or method are displayed on a display screen for user consumption. The computing system 300 may include an input subsystem 308 that receives user input. The input subsystem 308 may be configured to connect to and receive input from devices such as a mouse, keyboard or gaming controller. For example, a user input may indicate a request that a certain task is to be executed by the computing system 300, such as requesting the computing system 300 to display any of the above described information, or requesting that the user input updates or modifies existing stored information for processing. A communication subsystem 310 may allow the methods described above to be executed or provided over a computer network. For example, the communication subsystem 310 may be configured to enable the computing system 300 to communicate with a plurality of personal computing devices. The communication subsystem 310 may include wired and/or wireless communication devices to facilitate networked communication. The described methods or processes may be executed, provided, or implemented for a user or one or more computing devices via a computer-program product such as via an application programming interface (API).

In conclusion, disclosed is an auditing system for creating audits, presenting the audits to auditor users, capturing data via the audits, compiling results from captured data, and presenting the results. The auditing system is configured to define audit elements and sub elements in a parent-child fashion. The auditing system may be configured to extract scores via the audits and audit elements into customizable categories. A location of an auditor device may be determined for tailoring audit content to the auditor device based on the determined location (i.e. magnet style distribution of audits or audit elements). For example, it is possible to either "push" or "pull" specific zones (e.g., zone 561), sub-zones (e.g., sub-zone 314.89), and sub-sub-zones (etc.) based on the auditor's existing location. Machine-readable identification tags may be scanned via an auditor device for determining an identity of the scanned identification tag and associating the identification tag with an audit element. Audit results may be presented visually in an interactable graph format such that a user may view scores for each category of each audit element. The system solves the problems and overcomes the limitations described in the background section. For example, an audit may be customized to have any level of detail, and any number of audit elements, and as such, a user may accurately examine and report the quality of individual audit elements without subjectively weighing the quality of one item against another item to determine a general score.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An auditing system, the system comprising:
one or more storage machines holding instructions executable by one or more logic machines to effect the operations of:
creating an audit;
presenting the audit to an auditor user;
capturing data via an interface of the audit;
compiling the data as results; and
presenting the results;
wherein the instructions are further executable by the one or more logic machines to determine a location of an auditor device by tracking location data of the auditor device, for sending audit content to the auditor device according to the location;
wherein the location is a sub-zone of a business establishment, the sub-zone being one sub-zone of a plurality of sub-zones in the business establishment;
using the one or more logic machines, determining a first sub-zone in which the auditor device is located among the plurality of sub-zones in the business establishment by tracking the auditor device's location, and automatically sending a first audit content to the auditor device customized for auditable items in the first sub-zone;
using the one or more logic machines, determining a second sub-zone in which the auditor device is located among the plurality of sub-zones in the business establishment by tracking the auditor device's location, and automatically sending a second audit content to the auditor device customized for auditable items in the second sub-zone;
the first sub-zone being different from the second sub-zone such that the one or more logic machines determines a changed location from the first sub-zone to the second sub-zone, by tracking the auditor device's location; and
the first audit content being different from the second audit content due to the first sub-zone being different from the second sub-zone and due to the auditable items in the first sub-zone being different from the auditable items in the second sub-zone.

2. The auditing system of claim 1, wherein the audit includes audit elements, the audit elements configured to generate a score.

3. The auditing system of claim 2, wherein the instructions are further executable to categorize generated scores.

4. The auditing system of claim 1, wherein a GPS subsystem is included in the system for determining the location.

5. The auditing system of claim 1, wherein the instructions are further executable to determine a location via a Wi-Fi positioning system.

6. The auditing system of claim 1, wherein the system further includes a machine readable identification device being readable by an auditor device for identifying a real-world object.

7. The auditing system of claim 1, wherein the system further includes a database storing employee profile information such that the employee profile information is cross-referenceable with machine readable identification data captured by an auditor device.

8. The auditing system of claim 1, wherein the instructions are further executable to define locations of audit elements and present the locations via a map.

9. The auditing system of claim 1, wherein the instructions are further executable to present the results via a graph.

10. The auditing system of claim 1, wherein the instructions are further executable to receive a user input to schedule a task to be completed at a particular time as a scheduled task, and present the scheduled task to an auditor device;
wherein the operations include:
using the one or more logic machines, automatically determining an optimal worker, time of completion, target audit element, and sub-zone for optimally completing the task based on current operating conditions of the business establishment;
and regularly receiving updates on the operating conditions such that the one or more logic machines uses the updated operating conditions to determine the optimal worker, time of completion, target audit element, and sub-zone; and
providing a Graphical User Interface (GUI) to an auditor user;
receiving an input from the auditor user through the GUI, the input being a selection to indicate the current status of the task; and
based on the input, automatically updating and storing via the one or more logic machines, a current status of the task on a database.

11. The auditing system of claim 1, wherein the instructions are further executable to determine a scheduling value of an audit element and assign a task to a worker according to the scheduling value.

12. The auditing system of claim 1, wherein the instructions are further executable to determine a task needing to be completed at a certain time, and determine an appropriate worker for completing the task.

13. The auditing system of claim 1, wherein the instructions are further executable to register a status of a task that has been assigned to a worker, as a task status.

14. The auditing system of claim 13, wherein the instructions are further executable to, upon registering that a task status is complete, appropriately assigning an auditor to evaluate the task status.

15. The auditing system of claim 1, wherein the instructions are further executable to assign tasks according to a work type.

16. An auditing system, the system comprising:
one or more storage machines holding instructions executable by one or more logic machines to effect the operations of:
creating an audit;
presenting the audit to an auditor user;
capturing data via an interface of the audit;
compiling the data as results;
presenting the results;
wherein the audit includes audit elements, the audit elements configured to generate a score; and
wherein the instructions are further executable to categorize generated scores;
wherein the instructions are further executable by the one or more logic machines to determine a location of an auditor device by tracking location data of the auditor device, for sending audit content to the auditor device according to the location;
wherein the location is a sub-zone of a business establishment, the sub-zone being one sub-zone of a plurality of sub-zones in the business establishment;
using the one or more logic machines, determining a first sub-zone in which the auditor device is located among the plurality of sub-zones in the business establishment by tracking the auditor device's location, and automatically sending a first audit content to the auditor device customized for auditable items in the first sub-zone;
using the one or more logic machines, determining a second sub-zone in which the auditor device is located among the plurality of sub-zones in the business establishment by tracking the auditor device's location and automatically sending a second audit content to the auditor device customized for auditable items in the second sub-zone;
the first sub-zone being different from the second sub-zone such that the one or more logic machines determines a changed location from the first sub-zone to the second sub-zone, by tracking the auditor device's location; and
the first audit content being different from the second audit content due to the first sub-zone being different from the second sub-zone and due to the auditable items in the first sub-zone being different from the auditable items in the second sub-zone.

17. An auditing system, the system comprising:
one or more storage machines holding instructions executable by one or more logic machines to effect the operations of:
creating an audit;
presenting the audit to an auditor user;
capturing data via an interface of the audit;
compiling the data as results;
presenting the results;
wherein the audit includes audit elements, the audit elements configured to generate a score;
wherein the instructions are further executable to categorize generated scores; and
wherein the instructions are further executable by the one or more logic machines to determine a location of an auditor device by tracking location data of the auditor device, for sending audit content to the auditor device according to the location;
wherein the location is a sub-zone of a business establishment, the sub-zone being one sub-zone of a plurality of sub-zones in the business establishment;
using the one or more logic machines, determining a first sub-zone in which the auditor device is located among the plurality of sub-zones in the business establishment by tracking the auditor device's location, and automatically sending a first audit content to the auditor device customized for auditable items in the first sub-zone;
using the one or more logic machines, determining a second sub-zone in which the auditor device is located among the plurality of sub-zones in the business establishment by tracking the auditor device's location, and automatically sending a second audit content to the auditor device customized for auditable items in the second sub-zone;
the first sub-zone being different from the second sub-zone such that the one or more logic machines determines a changed location from the first sub-zone to the second sub-zone, by tracking the auditor device's location;
the first audit content being different from the second audit content due to the first sub-zone being different from the second sub-zone and due to the auditable items in the first sub-zone being different from the auditable items in the second sub-zone; and
wherein the scores are automatically categorized by the one or more logic machines in a parent-child relationship, such that certain categories are child categories of parent categories, and a set of child scores of such child categories affect a parent score of a parent category, the parent score being a hierarchical parent of the child scores; and
wherein the child scores are weighted such that some child scores have less impact on their parent score and for the same parent score some child scores have more impact on the same parent score.

18. The auditing system of claim 17, wherein the instructions are further executable to register a status of a task that has been assigned to a worker, as a task status, where the system is configured to register the status in response to a user input entered on a device carried by the worker.

19. The auditing system of claim 17, wherein the instructions are further executable to determine a task needing to be completed at a certain time, and determine an appropriate worker for completing the task.

* * * * *